US008682160B2

(12) United States Patent
Prakash et al.

(10) Patent No.: US 8,682,160 B2
(45) Date of Patent: Mar. 25, 2014

(54) PATH COMPUTATION SYSTEMS AND METHODS IN OPTICAL NETWORKS

(75) Inventors: Anurag Prakash, Noida (IN); Mohit Chhillar, Delhi (IN); Marian Trnkus, Chevy Chase, MD (US); Waseem Reyaz Khan, Haryana (IN)

(73) Assignee: Ciena Corporation, Hanover, MD (US)

( * ) Notice: Subject to any disclaimer, the term of this patent is extended or adjusted under 35 U.S.C. 154(b) by 133 days.

(21) Appl. No.: 13/420,717

(22) Filed: Mar. 15, 2012

(65) Prior Publication Data
US 2013/0202299 A1 Aug. 8, 2013

(51) Int. Cl.
H04J 14/00 (2006.01)

(52) U.S. Cl.
USPC ................................. 398/48; 398/59

(58) Field of Classification Search
USPC ................ 398/25, 59, 82, 83, 45, 48
See application file for complete search history.

(56) References Cited

U.S. PATENT DOCUMENTS

| | | | |
|---|---|---|---|
| 6,377,551 B1 | 4/2002 | Luo et al. | |
| 6,477,566 B1 | 11/2002 | Davis et al. | |
| 6,542,469 B1 | 4/2003 | Kelley et al. | |
| 6,804,199 B1 | 10/2004 | Kelly et al. | |
| 7,046,634 B2 | 5/2006 | Wong et al. | |
| 7,113,481 B2 | 9/2006 | Elie-Dit-Cosaque et al. | |
| 7,298,704 B2 * | 11/2007 | Kodialam et al. | 370/238 |
| 7,308,198 B1 | 12/2007 | Chudak et al. | |
| 7,362,974 B2 * | 4/2008 | De Patre et al. | 398/50 |
| 7,376,086 B1 | 5/2008 | Paraschiv | |
| 7,539,210 B2 | 5/2009 | Iovanna et al. | |
| 7,606,494 B1 | 10/2009 | Weston-Dawkes et al. | |
| 7,639,631 B2 | 12/2009 | Ashwood-Smith et al. | |
| 7,706,690 B2 * | 4/2010 | Nagata et al. | 398/83 |
| 2003/0099014 A1 * | 5/2003 | Egner et al. | 359/124 |
| 2004/0004938 A1 | 1/2004 | Buddhikot et al. | |
| 2005/0088978 A1 | 4/2005 | Zhang et al. | |
| 2005/0169196 A1 | 8/2005 | Carpenter et al. | |
| 2005/0237950 A1 | 10/2005 | Yuan et al. | |
| 2007/0047469 A1 | 3/2007 | Vasseur et al. | |

(Continued)

OTHER PUBLICATIONS

Y. Lee, G. Bernstein, D. Li, W. Imajuku; Routing and Wavelength Assignment Information Model for Wavelength Switched Optical Networks; Copyright (c) 2011 IETF Trust and the persons identified as the document authors: All rights reserved; Network Working Group—Internet Draft, Intended Status; Informational—Bernstein & Lee—Expires Apr. 31, 2012.

(Continued)

*Primary Examiner* — Dalzid Singh
(74) *Attorney, Agent, or Firm* — Clements Bernard PLLC; Christopher L. Bernard; Lawrence A. Baratta, Jr.

(57) ABSTRACT

A path computation method includes defining photonic constraints associated with a network, wherein the photonic constraints include wavelength capability constraints at each node in the network, wavelength availability constraints at each node in the network, and nodal connectivity constraints of each node in the network, and performing a constrained path computation in the network using Dijkstra's algorithm on a graph model of the network with the photonic constraints considered therein. An optical network includes a plurality of interconnected nodes each including wavelength capability constraints, wavelength availability constraints, and nodal connectivity constraints, and a path computation element associated with the plurality of interconnected photonic nodes, wherein the path computation element is configured to perform a constrained path computation through the plurality of interconnected nodes using Dijkstra's algorithm on a graph model with the photonic constraints considered therein.

16 Claims, 18 Drawing Sheets

(56) References Cited

U.S. PATENT DOCUMENTS

| | | | |
|---|---|---|---|
| 2009/0296719 A1* | 12/2009 | Maier et al. | 370/400 |
| 2010/0014859 A1 | 1/2010 | D'Alessandro et al. | |
| 2010/0086306 A1 | 4/2010 | D'Alessandro et al. | |
| 2010/0104282 A1 | 4/2010 | Khan et al. | |
| 2011/0188865 A1 | 8/2011 | Lalonde et al. | |
| 2011/0243030 A1* | 10/2011 | Zhang et al. | 370/254 |
| 2011/0274427 A1 | 11/2011 | Madrahalli et al. | |

OTHER PUBLICATIONS

Y. Lee, G. Bernstein, D. Li, G. Martinelli; "A Framework for the Control of Wavelength Switched Optical Networks (WSON) with Impairments"; Abstract—Network Working Group—Status of this Memo—This Internet—Draft is submitted in full conformance with the provisions of BCP 78 and BCP 79; Lee & Bernstein—Expires May 23, 2012.

G. Bernstein, Y. Lee; Shared Backup Mesh Protection in PCE-based WSON networks; IP+Optical Network; iPOP2008, Jun. 5-6, 2008, Tokyo, Japan.

Greg M. Bernstein, Young Lee, Anders Gavier, Jonas Martensson; "Modeling WDM Wavelength Switching Systems for use in GMPLS and Automated Path Computation"; OCIS Codes: 060.4250, 060.4251, 060.4264, 060.4265; Corresponding author: gregb@grotto-networking.com.

Y. Lee, G. Bernstein, W. Imajuku; "Internet Engineering Task Force (IETF)—Informational"; Framework for GMPLS and Path Computation Element (PCE) Control of Wavelength Switched Optical Networks (WSONs); Apr. 2011.

\* cited by examiner

PATH COMPUTATION SYSTEMS AND METHODS IN OPTICAL NETWORKS

CROSS-REFERENCE TO RELATED APPLICATION(S)

The present non-provisional patent claims the benefit of priority of co-pending Indian Patent Application No. 287/DEL/2012, filed on Feb. 2, 2012, and entitled "PATH COMPUTATION SYSTEMS AND METHODS IN OPTICAL NETWORKS," the contents of which are incorporated in full by reference herein.

FIELD OF THE INVENTION

Generally, the field of art of the present disclosure pertains to optical networking, and more particularly, to path computation systems and methods in optical networks considering link constraints and nodal constraints associated therewith.

BACKGROUND OF THE INVENTION

Distributed control planes have been used in communications networks for some time, gaining on popularity due to increased scalability and resiliency of a distributed management solution over a centralized management solution. In photonic domains, deployment of distributed control plane solution has been slow and initial deployments have only limited functionality. Photonic networks have more complicated topologies when compared to digital networks. A typical digital network assumes non-blocking switching functionality at a node and simple links connecting nodes, which simplifies network topology model and path computation algorithms. Photonic networks, on the contrary, introduce various constraints that complicate both network topology models and path computation. In addition to wavelength blocking on photonic links and wavelength reach, an architecture of a photonic node is custom, each having very unique constraints, such as size and type of digital switching fabric, interconnection between photonic ports and drop side ports or digital fabric, interconnection between photonic ports and photonic fabric, directionality and photonic port blocking, photonic port protection. Digital networks may use the Dijkstra shortest path algorithm to compute end to end path through the network. To compute a path in photonic networks, the Dijkstra algorithm has to be extended to consider unique constraints at each photonic node. Quite simply, it is significantly easier to model a digital network than a photonic network.

BRIEF SUMMARY OF THE INVENTION

In an exemplary embodiment, a processor implemented path computation method includes defining photonic constraints associated with a network, wherein the photonic constraints include wavelength capability constraints at each node in the network, wavelength availability constraints at each node in the network, and nodal connectivity constraints of each node in the network; and performing a constrained path computation in the network using Dijkstra's algorithm on a graph model of the network with the photonic constraints considered therein. The method may further include modifying the graph model to reflect the photonic constraints. The method may further include representing nodes in the network as vertices in the graph model; utilizing directed edges in the graph model to apply the wavelength capability constraints and the wavelength availability constraints; and utilizing connectivity pairs as a subset of edges incident on each of the vertices to apply the nodal connectivity constraints. The method may further include performing the constrained path computation in the network using Dijkstra's algorithm through spanning of the nodes and labeling of links and applying the photonic constraints. The method may further include modifying the graph model to reflect the photonic constraints by translating the network from an undirected graph to a directed graph through transforming egress unidirectional links from every node to vertices and interconnections within each node to edges.

The method may further include modifying the graph model to reflect the photonic constraints through labeling thereby avoiding a process of transforming the graph model. The method may further include performing the constrained path computation in the network using Dijkstra's algorithm on the modified graph model of the network. The method may further include, for a regenerator at one of the nodes, providing a directed edge (loopback) associated with the regenerator with a higher cost to bias path computation over the regenerator. The method may further include maintaining bit vectors for each of the wavelength capability constraints and wavelength availability constraints at each node in the network; maintaining a connectivity list for the nodal connectivity constraints of each node in the network; and communicating the bit vectors and the connectivity list utilizing a control plane. The method may further include computing disjoint paths with a modification of Suurballe's algorithm. This method may further include performing two iterations of Dijkstra's algorithm on a modified graph model to compute the disjoint paths, wherein a first iteration returns a shortest path while labeling links and nodes and computing disjoint weights for a second iteration, and wherein the second iteration returns shortest paths based on the disjoint weights; and correlating the shortest paths from the two iterations while maintaining the photonic constraints associated therewith.

In another exemplary embodiment, an optical network includes a plurality of interconnected nodes each including wavelength capability constraints, wavelength availability constraints, and nodal connectivity constraints; and a path computation element associated with the plurality of interconnected photonic nodes, wherein the path computation element is configured to perform a constrained path computation through the plurality of interconnected nodes using Dijkstra's algorithm on a graph model with the photonic constraints considered therein. The graph model may represent the plurality of interconnected nodes and associated links therebetween, and wherein the graph model may be modified to: represent each of the plurality of interconnected nodes as vertices; utilize directed edges to apply the wavelength capability constraints and the wavelength availability constraints; and utilize connectivity pairs as a subset of edges (something like bi-partite graphs) incident on each of the vertices to apply the nodal connectivity constraints. The path computation element may be configured to perform the constrained path computation using Dijkstra's algorithm through spanning of the nodes and labeling of links and applying the photonic constraints. The graph model may be modified to reflect the wavelength capability constraints, wavelength availability constraints, and nodal connectivity constraints by translating from an undirected graph to a directed graph through transforming egress unidirectional links from every node to vertices and interconnections within each node to edges.

The graph model may be modified to reflect the wavelength capability constraints, wavelength availability constraints, and nodal connectivity constraints through labeling thereby avoiding a process of transforming the graph model. The optical network may further include a control plane associated with the plurality of interconnected nodes and communicatively coupled to the path computation element; wherein each of the plurality of interconnected nodes may be configured to: maintain bit vectors for each of the wavelength capability constraints and wavelength availability constraints; maintain a connectivity list for the nodal connectivity constraints; and communicate the bit vectors and the connectivity list utilizing the control plane. The path computation element may be configured to compute disjoint paths with a modification of Suurballe's algorithm.

In yet another exemplary embodiment, a path computation element includes a processing device configured to: receive photonic constraints associated with a network, wherein the photonic constraints include wavelength capability constraints at each node in the network, wavelength availability constraints at each node in the network, and nodal connectivity constraints of each node in the network; create a graph model of the network with the photonic constraints considered therein; and perform a constrained path computation in the network using Dijkstra's algorithm on the graph model of the network. The graph model may include representation of nodes in the network as vertices; representation of directed edges to apply the wavelength capability constraints and the wavelength availability constraints; and representation of connectivity pairs as a subset of edges incident on each of the vertices to apply the nodal connectivity constraints.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, path computation systems and methods in mixed photonic and digital mesh networks define additional constraints required for paths in photonic network. The path computation systems and methods include shortest path algorithm that uses these constraints to compute paths in the photonic network. The definition of these constraints forms an important aspect of path computation algorithm to deliver an optimal path which follows wavelength continuity constraints. The constraints defined for the photonic network could fall into two broad categories, link constraints and nodal constraints. Routing in the electrical domain assumes that each node supports non-blocking switching, hence the computations for the digital network only use link constraints. In the photonic domain, the link constraints are extended to include not only resource availability but also resource capabilities as described herein. The Nodal constraints originate from the fact that the photonic nodes could have partial connectivity towards the fabric between various egress switching points.

Figure 1:
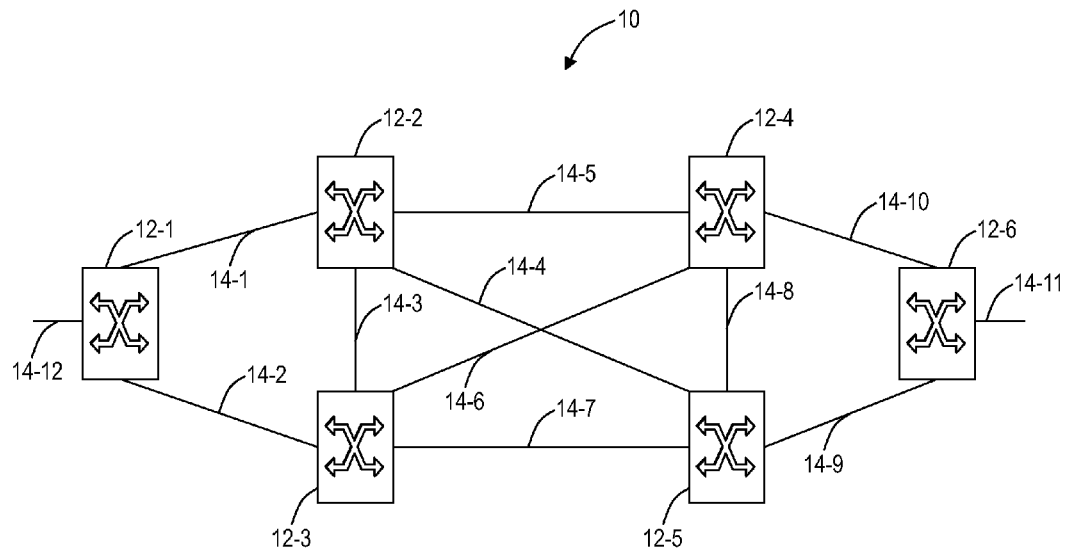
FIG. 1 is a network diagram of a network which is a mixed photonic and digital mesh network.

Referring to FIG. 1, in an exemplary embodiment, a network diagram illustrates a network 10 which is a mixed photonic and digital mesh network. The network 10 includes a plurality of network elements 12 interconnected therebetween via links 14. As described herein, the photonic portion of the network 10 includes an optical layer over the links 14, such as wavelength division multiplexing (WDM), dense WDM (DWDM), etc. The digital portion of the network 10 includes a protocol over the photonic links, such as, Optical Transport Network (OTN), Synchronous Optical Network (SONET), Synchronous Digital Hierarchy (SDH), Ethernet, or any other time division multiplexing (TDM) protocol. In an exemplary embodiment, the network elements 12 may include a nodal device that can consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network elements 12 may include any of an OTN/SONET/SDH add/drop multiplexer, a multi-service provisioning platform (MSPP), a digital cross-connect (DCS), an optical cross-connect, a WDM/DWDM terminal, a switch, a router, and the like.

The network 10 includes a control plane operating thereon between the network elements 12 and over the links 14. For example, each of the network elements 12 may include a controller that is responsible for all control plane processing. Generally, the control plane includes software, processes, algorithms, etc. that control configurable features of the network 10, such as automating discovery of the network elements 12, capacity on the links 14, port availability on the network elements 12, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements 12 and establishing connections therebetween.

Figure 2:
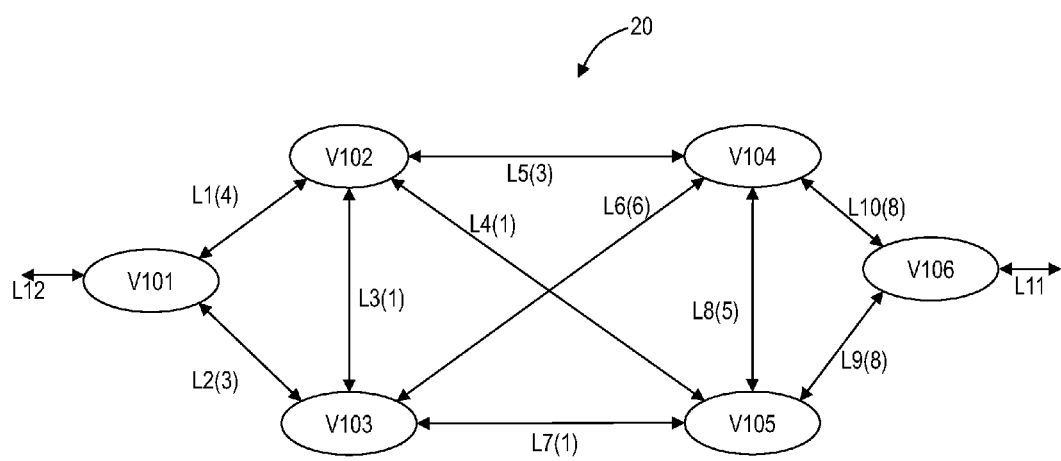
FIG. 2 is a graph G{Vx, Lx} of a graphical representation of the network of FIG. 1 which each network element defined as a vertex (Vx) and each link defined as a link (Lx) with an associated administrative weight.

Referring to FIG. 2, in an exemplary embodiment, a graph 20 provides a graphical representation of the network 10 which each network element 12 defined as a vertex (Vx) and each link 14 defined as a link (Lx) with an associated administrative weight. Thus, the graph 20 is a graph G={Vx, Lx}. In the digital domain, the control plane may use the Dijkstra algorithm G{Vx, Lx} for computing a shortest path through the network. However, in the photonic domain, several restrictions occur which may lead to an incorrect or invalid result from the Dijkstra algorithm G{Vx, Lx}. For example, the vertices V101-V106 may not all be N×N interconnected therebetween, i.e. a blocking switch. From a photonic perspective, the links L1-L12 may not be able to carry a specific wavelength across a vertex even though there is N×N connectivity, e.g. the specific wavelength may be already provisioned/taken. Even after applying nodal constraints in the Dijkstra algorithm, certain longer sub-paths may be excluded prematurely or fail the shorter ones on further nodes due to M×N connectivity associated with the photonic layer. That is, wavelength continuity across all links used for the path needs to be validated As described herein, each of the vertices Vx represent a network element 12 in the network 10. Further, the vertices Vx and the network elements 12 may be referred to herein as nodes.

The Dijkstra algorithm approach focuses on computation of a path in a single network layer. The Dijkstra algorithm finds a single pass through a node. If the same node is visited again, the algorithm considers this path invalid. In multi-layer networks, the signal connectivity may be provided at multiple both client and server layers. In the simplest case, there may be fixed connection in client layer that passes client signal from one server port to another. To accommodate these cases, the algorithm has to allow multiple passes through the same node, as a single client is passed through two server layer paths. The most obvious example of this functionality is a regenerator function on a photonic switching node. To support photonic control plane, the network elements 12 in the network 10 have to support discovery of network topology, nodal connectivity, nodal connectivity constraints, inter-layer connectivity, nodal switching capabilities; dissemination of topology and nodal constraint information to other network elements 12; and path computation capabilities that consider network topology of both photonic and digital network, in conjunction with nodal constraints and wavelength blocking.

Figure 3:
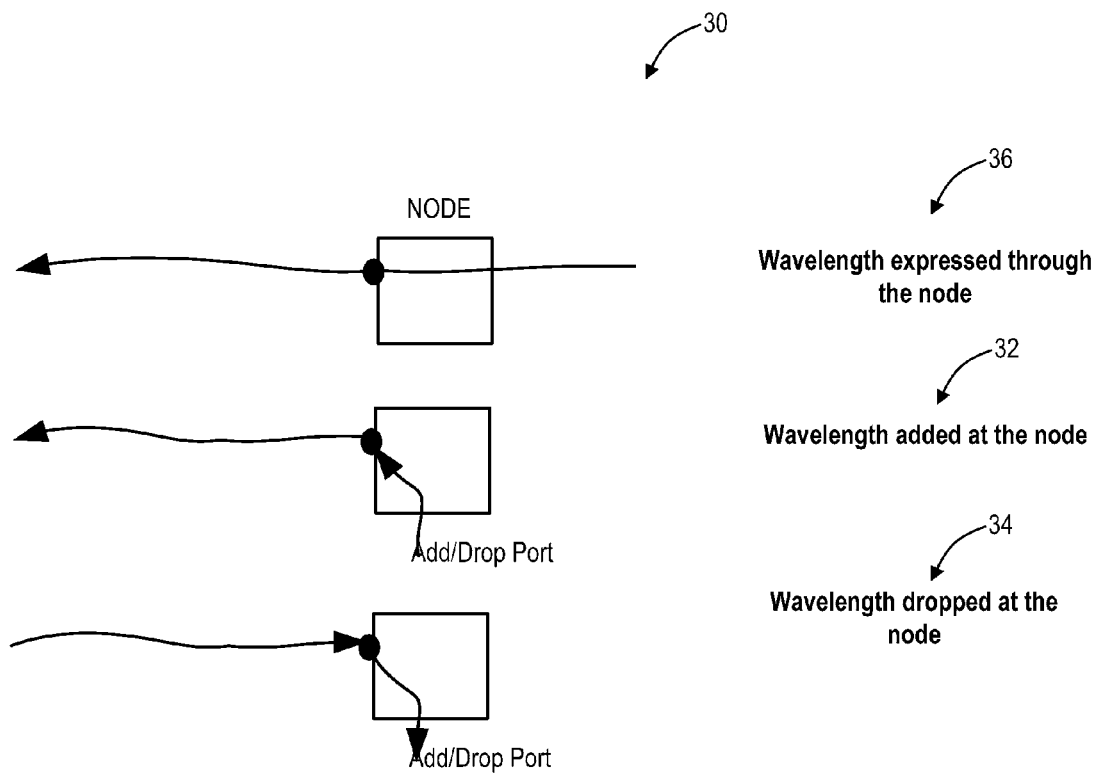
FIG. 3 is a diagram of wavelength capability in the path computation systems and methods in mixed photonic and digital mesh networks.

Referring to FIG. 3, in an exemplary embodiment, a diagram illustrates wavelength capability 30 in the path computation systems and methods in mixed photonic and digital mesh networks. In various exemplary embodiments, the path computation systems and methods in mixed photonic and digital mesh networks add additional constraints which are considered therein. These additional constraints include wavelength capability 30, i.e. add/drop/express capability of a wavelength at each node; wavelength availability, i.e. availability of each wavelength in both directions at each node; and nodal connectivity constraints, i.e. ability to connect a wavelength through each node. The wavelength capability determines if a wavelength may be added 32, dropped 34, or expressed 36 at this network element 12. This capability 30 is required for all nodes in photonic network. The capability 30 is defined at both ends of a wavelength between two nodes.

In an exemplary embodiment, the path computation systems and methods may define a wavelength capability vector which defines vector capabilities in a compressed form suitable for dissemination with traditional link advertisements in the control plane. For example, the wavelength capability 30 constraint may defined as per the following table. The Optical Multiplex Section (OMS) Link defines a bit vector with two bits for each wavelength set as per the following table, known as capability vector.

| Wavelength Capability Vector | 24 Bytes Max for 96 channels |
|---|---|
| Wavelength could be Added or dropped only | 01 |
| Wavelength could be Expressed only | 10 |
| Wavelength could be Added or dropped or Expressed | 11 |
| Wavelength Unavailable | 00 |

The wavelength capability constraint is validated against a table derived during a run of a path computation. The destination node could be either a remote end of the link selected or not the remote end of the link selected. If the destination node is the remote end, the requested wavelength on the remote end of the link should be capable of being Dropped on that node. Alternatively, the requested wavelength on the near end of the link should be capable of being Added or Expressed on that node based on the node being originating or intermediate respectively. If the destination node is not the remote end, the requested wavelength on the remote end of the link should be capable of being Expressed on that node. Alternatively, the requested wavelength on the near end of the link should be capable of being Added or Expressed on that node based on the node being originating or intermediate respectively. An exemplary result of this decision process is in the following table used for nodal capability validation for a particular link. Here the NEAR END signifies egress link from a node during the path computation run and FAR end signifies ingress link into the downstream node.

| | NEAR END | FAR END |
|---|---|---|
| ORIG | ADD | N/A |
| TERM | N/A | DROP |
| INTERM | EXPRESS | EXPRESS |

Figure 4:
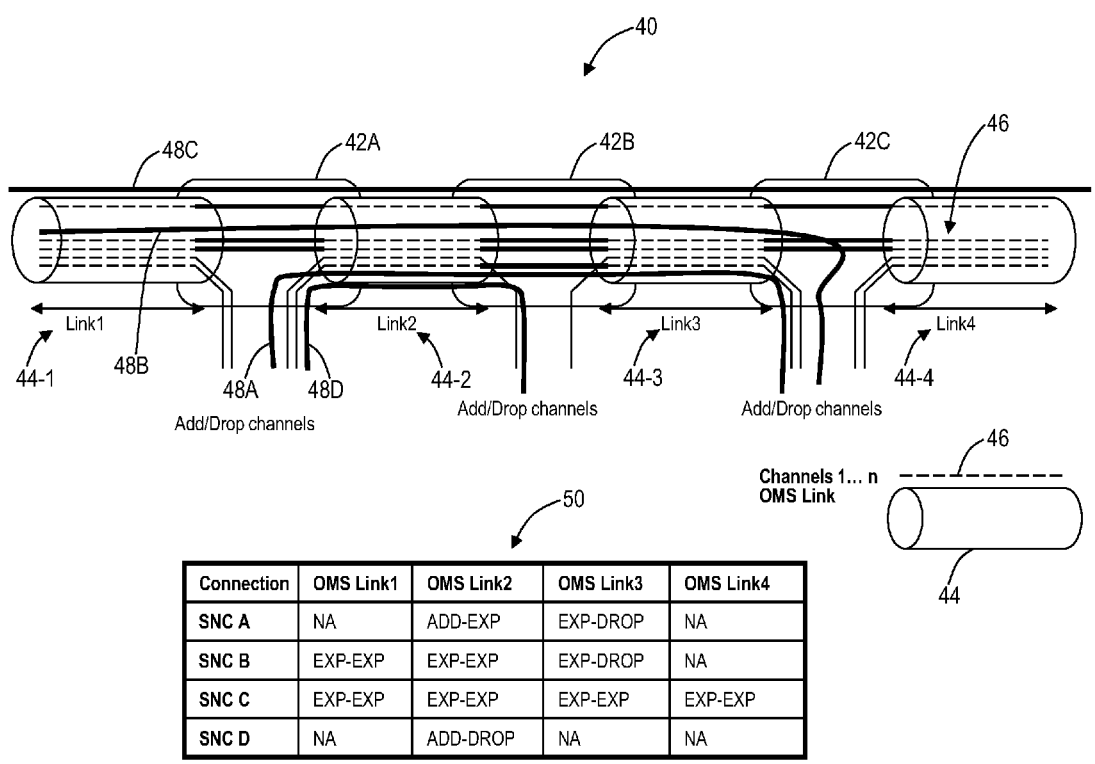
FIG. 4 is a network diagram of a network illustrating additional link constraints using a wavelength capability constraint.

Referring to FIG. 4, in an exemplary embodiment, a network diagram of a network 40 illustrates additional link constraints using the wavelength capability constraint. In particular, the network 40 includes three degree two nodes 42A, 42B, 42C and four associated OMS links 44-1, 44-2, 44-3, 44-4. The nodes 42 and the links 44 include multiple wavelength channels 46. In an exemplary embodiment, the network 40 may include four subnetwork connections (SNCs) 48A, 48B, 48C, 48D. A table 50 illustrates the wavelength capability 30 designations for each of the SNCs 48A, 48B, 48C, 48D. The path computation systems and methods may include the wavelength capability vector for each of the multiple wavelength channels 46 at each of the nodes 42A, 42B, 42C and use this wavelength capability vector as a first link constraint. This new constraint in the path computation is matched with the wavelength capability vector and a decision is taken if this path is used for further computation. A valid path is one that matches the wavelength capability with wavelength constraint at this node.

In addition to the wavelength capability vector as a constraint, the path computation systems and methods may also utilize a wavelength availability constraint in both forward and backward directions. In particular, a wavelength availability vector may identify if a specific wavelength is in use on a link. The vector is defined for both ingress and egress direction. A wavelength has to be available in both directions to qualify for use in new path. Once identified as available and selected, the wavelength availability vector is marked to place wavelength in use. The wavelength availability vector provides two functions, namely to identify if a wavelength is available in both ingress and egress direction and to identify which wavelengths are available in ingress and egress direction. An exemplary compressed form of a wavelength availability vector suitable for dissemination in the control plane when appended to link advertisements is shown in the table below. The vector includes a single bit representing available or in-use wavelength. Position in the vector defines label used for the wavelength, which then is mapped into a specific wavelength.

| Wavelength Availability Vector | 12 Bytes Max for 96 channels |
|---|---|
| Lambda Available for Services | 1 |
| Lambda NOT Available for Services | 0 |

Figure 5:
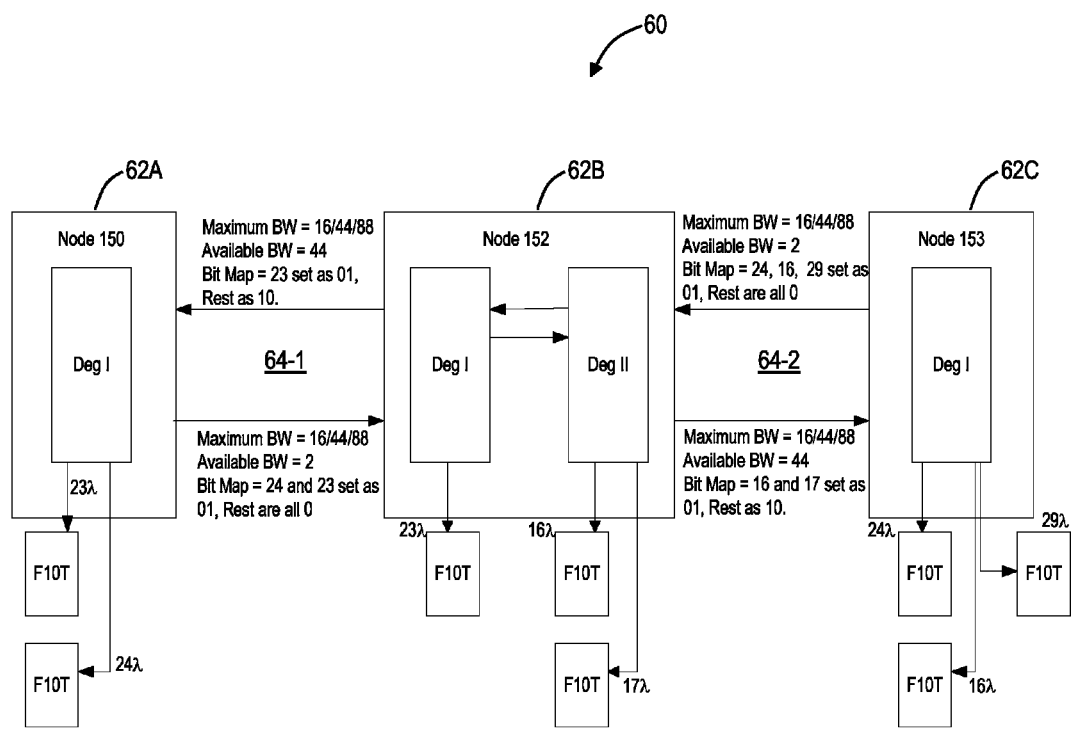
FIG. 5 is a network diagram of a network 60 illustrating an example of wavelength availability and capability bit vectors.

Referring to FIG. 5, in an exemplary embodiment, a network diagram of a network 60 illustrates an example of wavelength availability and capability bit vectors. The network 60 includes three nodes 62A, 62B, 62C and two links 64-1, 64-2. The node 62A is a one-degree node with local add/drop of 23 wavelengths and 24 wavelengths. The node 62B is a two-degree node with local add/drop of 23 wavelengths on one degree and 16 and 17 wavelengths on another degree. The node 62C is a one-degree node with local add/drop of 24, 29, and 16 wavelengths. The bit vectors are set accordingly as shown in FIG. 5.

Figure 6:
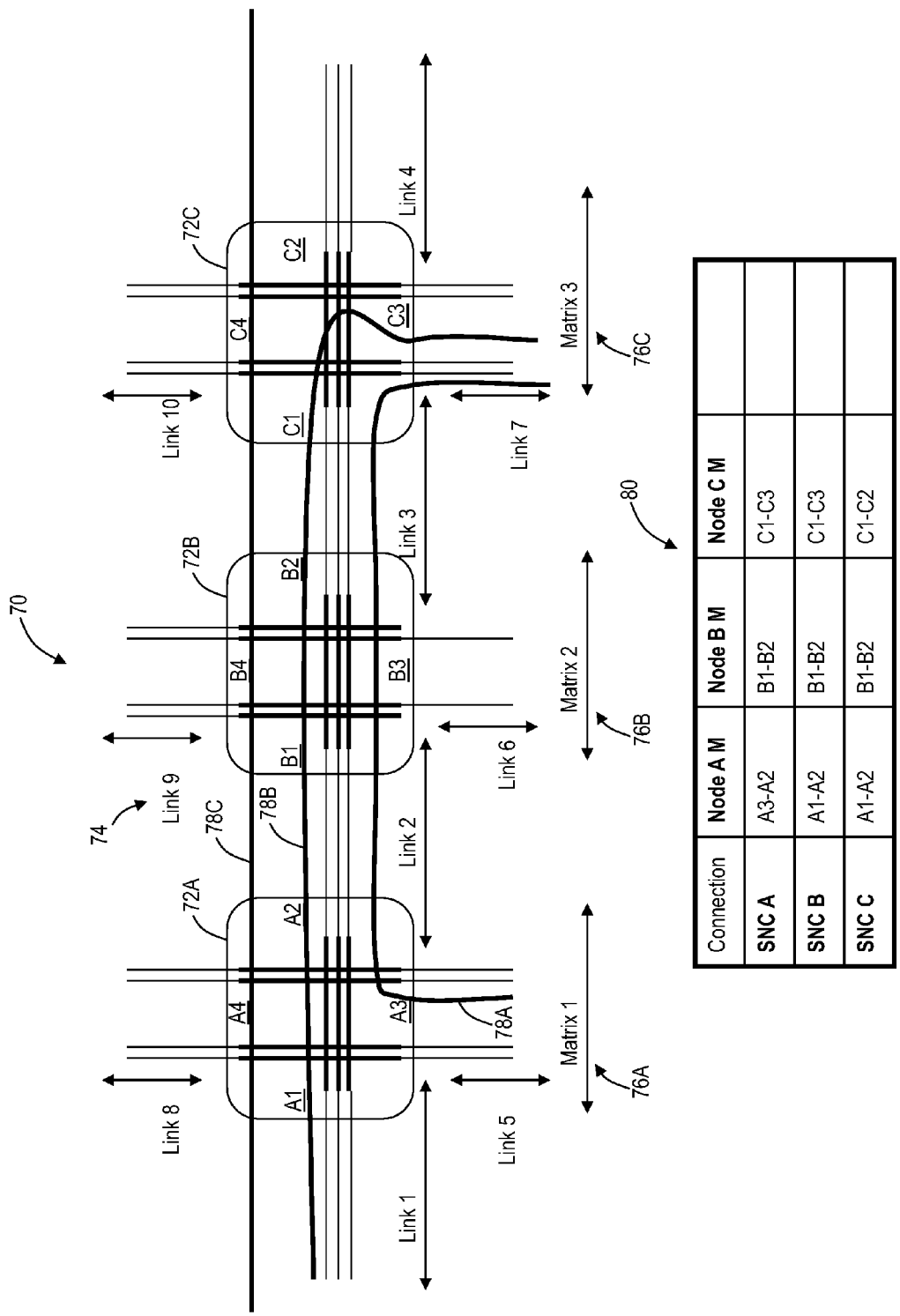
FIG. 6 is a network diagram of a network illustrating an example of nodal constraints for the path computation systems and methods.

Referring to FIG. 6, in an exemplary embodiment, a network diagram of a network 70 illustrates an example of nodal constraints for the path computation systems and methods. The network includes three degree-four nodes 72A, 72B, 72C. The degrees of the node 72A are designated as A1, A2, A3, and A4. The degrees of the node 72B are designated as B1, B2, B3, B4. The degrees of the node 72C are designated as C1, C2, C3, C4. The network 70 further includes ten links 74 and matrices 76A, 76B, 76C, i.e. one matrix per node.

Each photonic node 72 is unique in that switching functionality of photonic fabric may be limited to a specific subset of photonic degrees (OMS ports). Implementation of each node 72 in the photonic network may place limits on which ports may be connected. In specific cases, traffic from a specific wavelength may be connected via a external patch fiber or other fixed connection to another wavelength.

In the path computation systems and methods, nodal connectivity constraints identify possibilities of making a connection between two optical channels in specific photonic degrees (an OMS), or opportunities to loopback traffic between two wavelengths on the same degree. A loopback may be limited to subset of wavelengths on this port, which is further defined by wavelength capability and availability constraint. In an exemplary embodiment, the path computation systems and methods may include an OMS port connectivity list that identifies possibility of fixed or switched connection between OMS ports (degrees). The list size is variable based on number of OMS ports in the identifier array. List contains pairs of ports that maybe connected. For example, the following table is an example of the OMS port connectivity list (which may also be referred to as a connectivity table or matrix, and generally is denoted herein as M).

| A3-A2 | A1-A2 | A2-A3 | A3-A3 | ... |
|---|---|---|---|---|

A pair of ports defines availability of connection between them. For example A3-A2 denotes connectivity between degrees A3 and A2 on the node 72A. If a pair of ports is missing from the list, connectivity for this pair is not available. If both ports in the pair are the same, the port supports loopback on this port. In an exemplary embodiment, the network 70 may include three SNCs 78A, 78B, 78C with a table 80 illustrating an exemplary connectivity list associated therewith.

Thus, the path computation systems and methods may include four additional constraints. The first constraint may include wavelength capability such as defined by the capability vector. The second constraint may include wavelength availability such as defined by the availability vector. A third constraint may include wavelength requirements defined during a path computation must match according to the capability vector. Finally, a fourth constraint may include a nodal optical connectivity constraint that is only applicable to intermediate nodes. This nodal optical connectivity constraint validates from a pre-defined matrix, i.e. the connectivity list, if an ingress port is expressed to another degree.

Figure 7A:
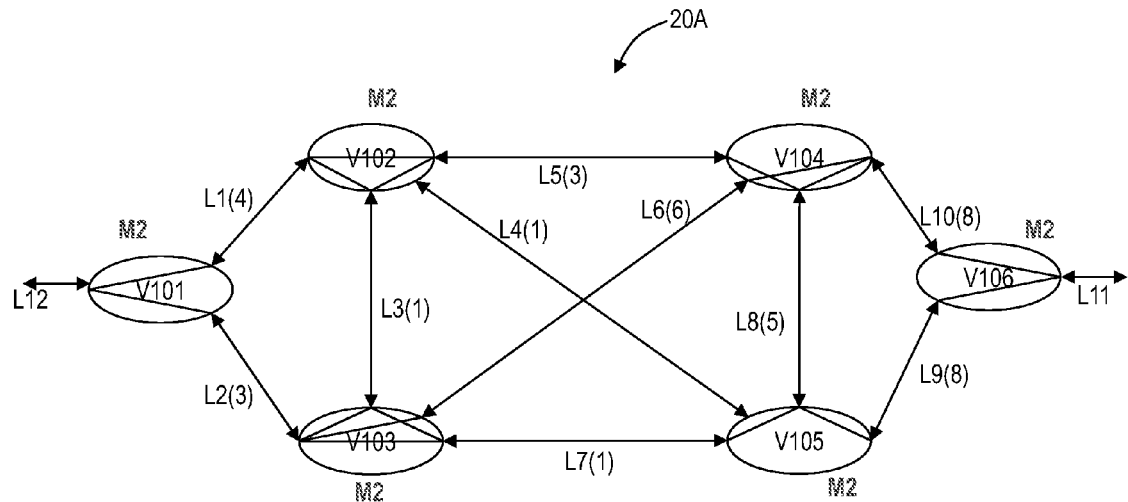
FIGS. 7A and 7B are graphs of a modified graph of the network if FIG. 1 to reflect photonic layer constraints, namely wavelength capability, wavelength availability and port connectivity.
Figure 7B:
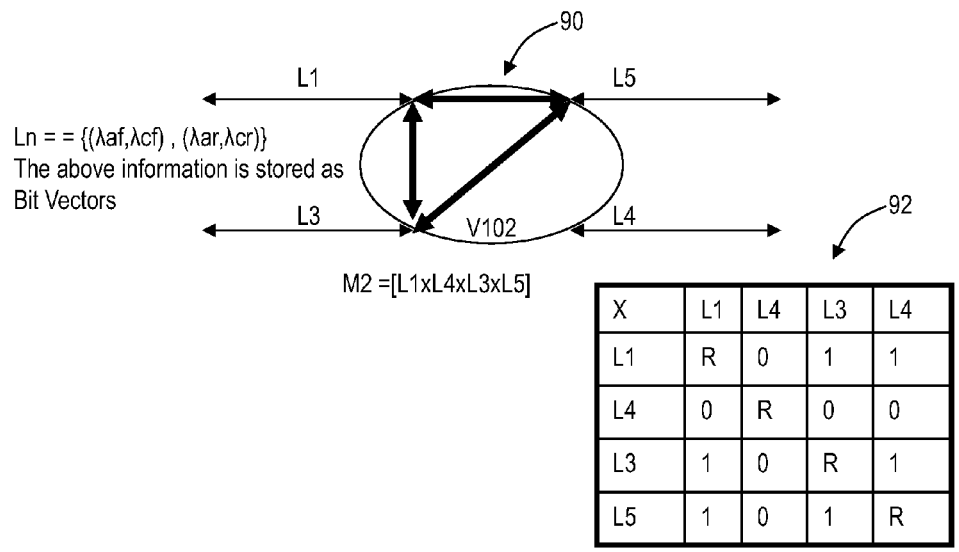

Referring to FIGS. 7A and 7B, in an exemplary embodiment, a modified graph 20A of the network 10 is illustrated to reflect photonic layer constraints, namely wavelength capability, wavelength availability and port connectivity. The modified graph 20A G=(V, E*, M) where:

V={v|Vertices v∈Nodes in the network}—Vertices representing nodes in the network E*={e|Directed Edges as a function e(λaf, λar, λcf, λcr)}—Directed edges applying wavelength capability and availability constraints λaf=λ availability in forward direction from vertex v λar=λ availability in reverse direction from vertex v λcf=λ capability of edge e incident on vertex v in forward direction λcr=λ capability of edge e incident on vertex v in reverse direction e={(λaf, λf), (λar, λcr)}

M={m|Connectivity pairs as subset of Edges E incident on Vertex v∈V}—Nodal connectivity constraints
  m=[[en, en], . . . ] . . . list of connectivity pairs for each node
  en=all the edges incident on vertex v
  K_paths=List of K shortest Paths from source to destination.

Hence the Shortest Path First Dijkstra algorithm can be adapted to a network with multiple constraints defined as part of any vertex or any edge. In the definition of the graph above the constraints are defined as:

Edge constraints: e (λaf, λar, λcf, λcr)
Vertex constraints: m=[en X en]

The λaf, λar (availability constraints) are defined as if the edge is currently available for path computation in either direction (forward, reverse). The λc (capability constraint for the edge) is defined as if the edge terminates on that vertex or can be switched across that particular vertex. Hence the capability is defined as
  λfc={O, E, A}
  λrc={T, E, A},
where O=Originates, T=Terminates, E=Express, and A=Any.

FIG. 7B illustrates the node/vertex V102 in the modified graph 20A. The node V102 has wavelength availability and capability constraints Ln={(λaf,λcf), (λar,λcr)} which are stored as bit vectors. From a nodal perspective, the node V 102 has nodal constraints 90 M2=[L1×L4×L3×L5]. The nodal constraints 90 M2 may be summarized in a table 92. For example, the table 92 is a 4×4 matrix since the node V102 is a four-degree node. The rows and columns correspond to the degrees, L1, L4, L3, L5, associated with the node V102. Entries in the table 92 are 0 for non-connectivity between the degrees and 1 for connectivity. The diagonal in the table 92 is denoted as R and represents a regenerator, i.e. ingress/egress on the same degree includes a regenerator or loop-back. As described herein, the path computation may be biased to avoid regenerators.

Figure 8A:
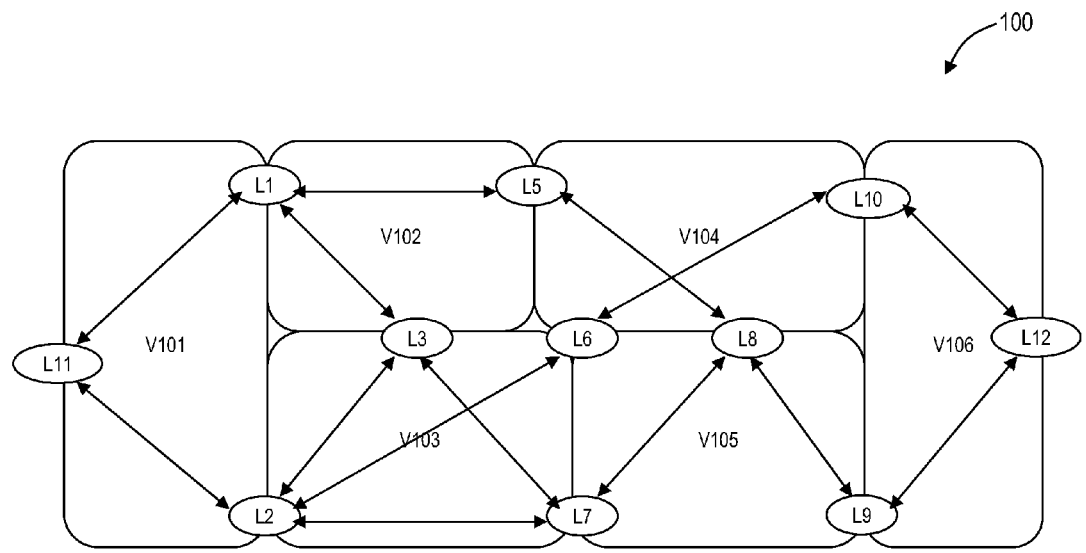
FIGS. 8A and 8B are graphs of showing a transformed graph through labeling without going through the process of transformation.
Figure 8B:
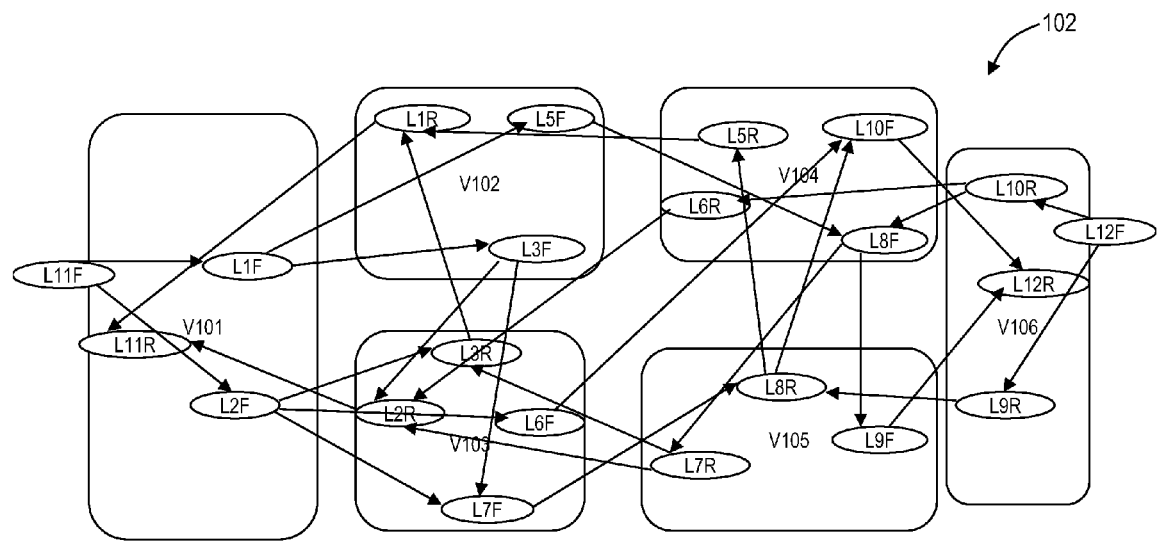

Referring to FIGS. 8A and 8B, in an exemplary embodiment, graphs 100, 102 illustrates an exemplary run of the path computation systems and methods with a modified Dijkstra algorithm based on G(V, E*, M) for computing K shortest paths. Optical path computation, in the path computation systems and methods, covers the following (all based on positive weights): link and node constrained path computation based on the modified Dijkstra algorithm; K shortest paths returned; non blocking available wavelengths (routing and wavelength assignments (RWA)) are returned in a vector which may be mapped to the ITU grid or any custom wavelength grid, wavelength continuity and wavelength availability in both directions: nodal constraints (blocking factors for add/drop vs. expressed wavelengths); no addition of link or nodes or weights to the graph is required, only conceptually the algorithm run on a transformed graph (no data structure transformation in control plane on run time); and application of OTN or other digital-based constraints on original and terminating nodes for sub-rate demands.

The modified Dijkstra algorithm is based on spanning of nodes but labeling of links instead of the nodes. This allows the graph to be viewed as interconnected links instead of nodes with zero weights, however this also allows avoiding any cyclic loops within a node, since the modified Dijkstra algorithm still spans the nodes. In particular, this allows more than one ingress link to a node. The links and nodal constraints as described herein are applied. A Connectivity pair list Validation using the connectivity pair list M allows entry and exit of a node only once for same path. That is, access to a connectivity pair list twice for the same Path is not allowed. Additionally, the wavelength availability and capability constraints are also determined and validated. In an exemplary embodiment, regeneration ports get added as virtual penalty links within the graph thereby preferring paths without regeneration.

Before using the link and nodal constraints and the modified graph model for path computation, it is important that to define a "transformation" graph 102 of the graph 100 to represent this graph suitable for graph search algorithms. Unlike a traditional network model adapted to a graph by replacing switching points with vertices and links with edges, photonic networks need a different transformation. This transformation allows the graph search algorithms to provide accurate results along with the existence of partial connectivity of switching points in the photonic networks. Importantly, no data structures and the given graph are modified. This transformation gives the proof of correctness of the modified algorithm. Hence conceptually the Dijkstra runs on the transformed graph, the implementation described here does not include any step of transformation.

Being a link-state based algorithm, the modified graph 102 translates the network from an undirected graph 100 to a directed graph 102 as per the following rules. Egress unidirectional links (edges) from every vertex (switching point) are transformed to vertices. The interconnections within the node (vertex) are transformed to edges. The regeneration ports are represented as loopback links (edges) with a higher cost in the network. These are excluded from transformation to vertex v' in the newly transformed graph. However their connectivity pair list gets transformed to edges e' to allow path computation to proceed with subpaths through regenerators too. The ingress unidirectional links on a vertex are ignored so as to avoid cyclic loops through ports within the same node.

The transformation can be represented as:
G(V, E*, M)=>G' (V', E')
Here G (V, E*, M) is the modified graph model represented earlier.
G' is the new graph seen by a Dijkstra algorithm run, where V' and E' represent the following:
  V'={v'∈E: {v'={(λaf,λcf), (λar,λcr)}|Unidirectional egress edge in egress direction}
  E'={e'∈M: {m=[[em, en], . . . ]|Connectivity pair}
Here the edge is the link between the egress unidirectional vertex v' on one node to the vertex v' on the next node connected via the connectivity pair.

The Dijkstra algorithm can be applied to the abovementioned transformed graph 102 giving accurate results for photonic networks with nodal constraints. However the algorithmic implementation described above does not actually create a new transformed graph. This is to avoid any performance issues in the path computation in a distributed control plane implementation. The algorithm is implemented with some differences from Dijkstra to conceptually view the modified Graph G(V, E*, M[ ]) as a transformed graph. A first difference in implementation includes labeling of egress unidirectional links instead of nodes. Advantageously, this allows a view of the graph 100 as the above-mentioned transformed graph G' 102 without going through the process of transformation. In particular, FIGS. 8A and 8B illustrate this labeling. Another implementation difference includes remembering not only the previous vertex but also the previous links, since labeling is being done on the links. In particular, the graph 102 includes vertices as the links, labeled as L1F (link 1 forward) and L1R (link 1 reverse), etc.

Yet another implementation difference includes spanning of nodes to allow ignoring of the ingress unidirectional links from the graph. This prevents cycling through v' within a node. There is always one ingress and one egress point from a node. A special case of regeneration with or without wavelength conversion is identified as a loopback link on the node. Since the Dijkstra algorithm is now running on a directed graph, sub-graph cycles within a path cannot be avoided. Hence the algorithm avoids these by following condition: current sub-graph path should not contain the next node and/or link in the path. Even though the algorithm runs on directed edges, wavelength constraints are always applied in both directions. This allows the algorithm to find bi-directional paths. Since regeneration is a loopback link, it is not considered as a vertex v' part of the graph transformation. However, based on connectivity pairs it gets directly transformed to an edge e' with a higher/penalty cost allowing path computation to proceed across the regenerators. Since it is a bi-directional link in the network topology, the link and nodal constraints are validated against the regeneration port.

The foregoing algorithm provides an exemplary modified Dijkstra algorithm using the link and nodal constraints with the transformed graph G' 102:

```
function compute_dijkstra(dest):
 1   vertex u = local;
 2   for each edge e in u:
         //Define λc capability constraint as per the path
         //computation. Here we define forward and reverse
         //(λfc, λrc) values being either orig, term or expressed.
         //This constraint is determined based on the position
         //of the edge in the complete path.
 3           e_λfc = O; //λc Originates
 4           e_λrc = E; //λc Expressed
 5       if dest = e.remote_end //Edge incident on dest vertex
 6           e_λfc = O; //λc Originates
 7           e_λrc = T; //λc Terminates
 8       endif
         //Verify for Edge constraint: Here all the edge constraints
         //both (λfc, λrc) as determined above and (λfa, λra) are
         //validated.
 9       add = validate_edge_constraint( );
10       if add = true
11           path    = make_path(e);
12           path_list = add_path_to_path_list(path);
13       endif
14   end for ;
15
16   while path_list
17       path = path_list->head;
18       hops = path.hop_count;
         //Remember Previous edge as well and not only the previous
         //hop since we have to determine vertex constraints as
         // well. This will help us in validating against the vertex
         // constraints [M].
19       previous_edge = path[hops-2].edge;
         if (previous_edge.Label == Label) continue; endif
         Previous_edge. Label = Label;
20       path_list->head = path_list->nextpath;
21       if dest = path[hops-1].node;
             //Stores in increasing order of distance
22           save_path_to_k_shortest_list(path, k_paths);
23           break;
24       endif
25       previous_vertex u = path[hops-1].node;
26       for each edge e in u:
             //Define λc capability constraint as per the path
             //computation. Here we define forward and reverse
             //(λfc, λrc) values being either orig, term or expressed.
             //This constraint is determined based on the position
             //of the edge in the complete path.
27           e_λcf = E; //λc Expressed
28           e_λcr = E; //λc Expressed
29           if dest = e.remote_end //Edge incident on dest vertex
30               e_λcr = T; //λc Terminates
31           endif
             //Here we validate against the vertex constraints M[ ].
             //The previous hop stored above and the current edge
             //are validated against M[ ] in the following function.
32           add = link_allow_exp_matrix(e, previous_edge);
             //Verify for Edge constraint
33           if (add == false) continue; endif
34           add = validate_edge_constraint( );
35           if (add == false) continue;
36           endif
             //Adds edge e to path
37           nextpath = append_path(path,e);
38           add_path_to_path_list(nextpath);
39       end for
40   end while
end compute_dijkstra.
```

Figure 9:
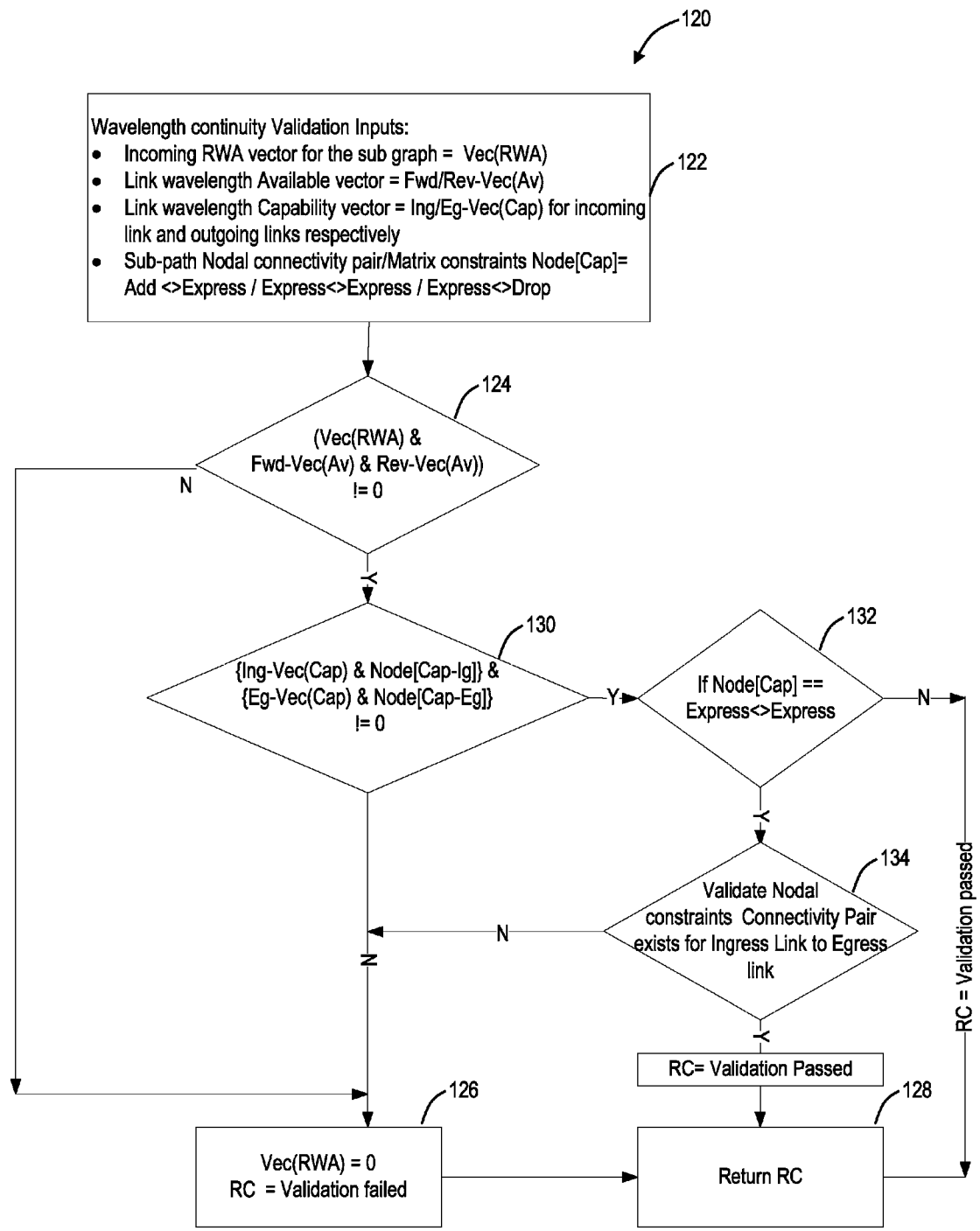
FIG. 9 is a flowchart of a constraint validation method for wavelength continuity validation for a sub graph from the modified Dijkstra algorithm.

Referring to FIG. 9, in an exemplary embodiment, a flowchart illustrates constraint validation method 120 for wavelength continuity validation for a sub graph from the modified Dijkstra algorithm. The constraint validation method 120 receives inputs including an incoming Routing and Wavelength Assignment (RWA) vector for a sub graph, Vec(RWA), a link wavelength availability vector, Fwd/Rev-Vec(Av), a link wavelength capability vector, Ing/Eg-Vec(Cap) for incoming links and outgoing links respectively, and a sub-path nodal connectivity pair/matrix constraints, Node[Cap]= add<>express/express<>express/express<>drop (step 122). If the (Vec(RWA) & Fwd-Vec(Av) & Rev-Vec(Av)) are equal to zero (step 124), the constraint validation method 120 sets the Vec(RWA) to zero and denotes a validation failures (step 126), and returns to a routing controller (RC) (step 128). If the (Vec(RWA) & Fwd-Vec(Av) & Rev-Vec(Av)) are not equal to zero (step 124), the constraint validation method 120 checks if {Ing-Vec(Cap) & Node[Cap-Ig]} & {Eg-Vec(Cap) & Node[Cap-Eg]} are equal to zero (step 130). If these inputs are equal to zero, the constraint validation method 120 sets the Vec(RWA) to zero and denotes a validation failures (step 126), and returns to the routing controller (RC) (step 128). If these inputs are not equal to zero, the constraint validation method 120 checks if the Node[Cap] is equal to express<>express (step 132). If the node capabilities are not express<>express, then the validation passes and the constraint validation method 120 returns to the routing controller (RC) (step 128). If the node capabilities are express<>express, the constraint validation method 120 validates if a Nodal constraints Connectivity Pair exists for Ingress Link to Egress link (step 134). If a pair does not exist, the constraint validation method 120 sets the Vec(RWA) to zero and denotes a validation failures (step 126), and returns to the routing controller (RC) (step 128). If a pair does exist, the validation is passed, and the constraint validation method 120 returns to the routing controller (RC) (step 128).

Figure 10A:
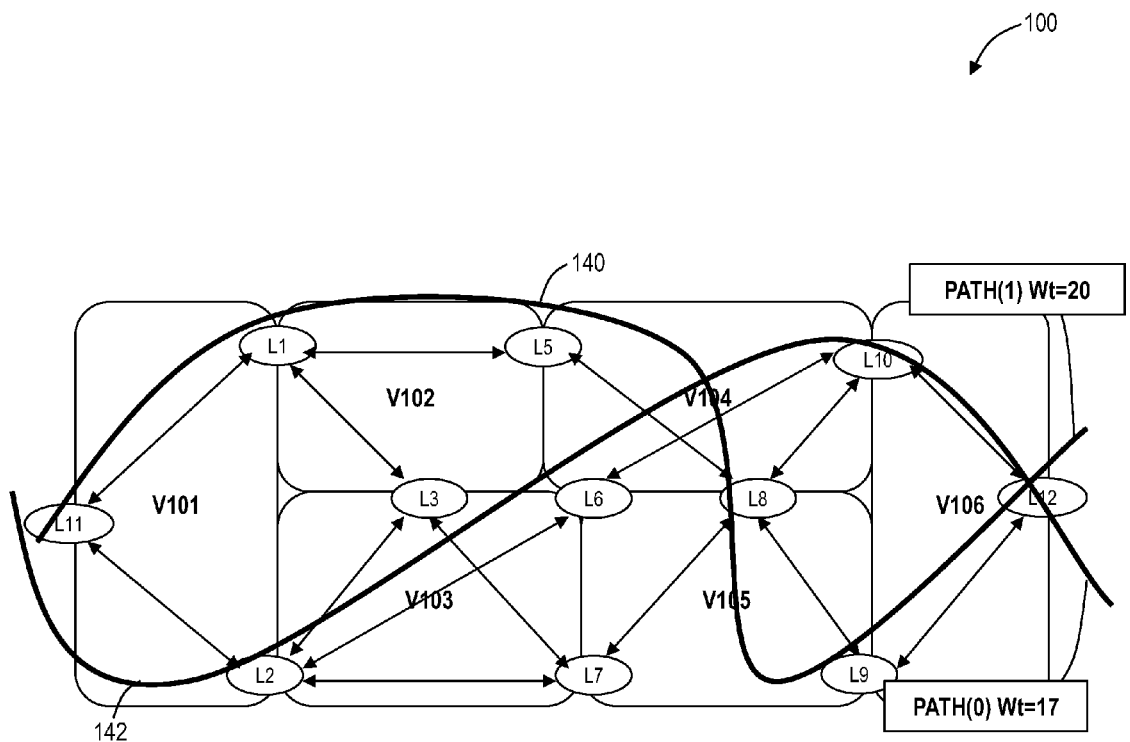
FIGS. 10A and 10B are graphs with exemplary path computations in the network of FIG. 1.
Figure 10B:
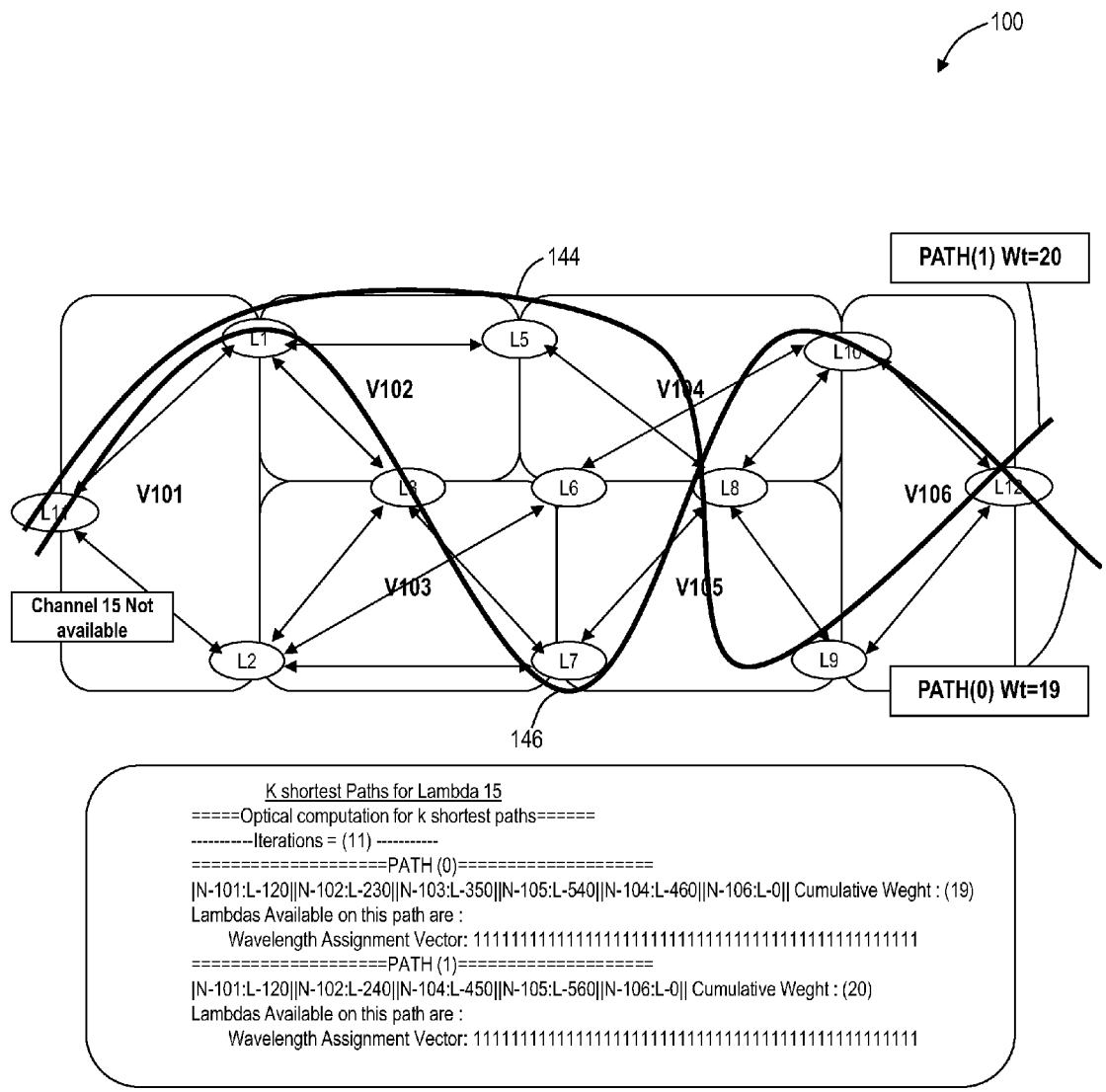

Referring to FIGS. 10A and 10B, in exemplary embodiments, the graph 100 is illustrated with exemplary path computations in the network 10. In particular, these exemplary path computations utilize the network 10 of FIG. 1 and the associated administrative weights in the graph 20 of FIG. 2 along with the link and nodal constraints. For example, a path is determined in both FIGS. 10A and 10B for wavelength channel 15. In FIG. 10A, the path computation provides two paths 140, 142 with respective weights of 20, 17. In FIG. 10B, the wavelength channel 15 is changed to unavailable at the node V101, i.e. the network element 12-1, and the path computation is rerun providing two paths 144, 146 with respective weights of 20, 19.

Figure 11:
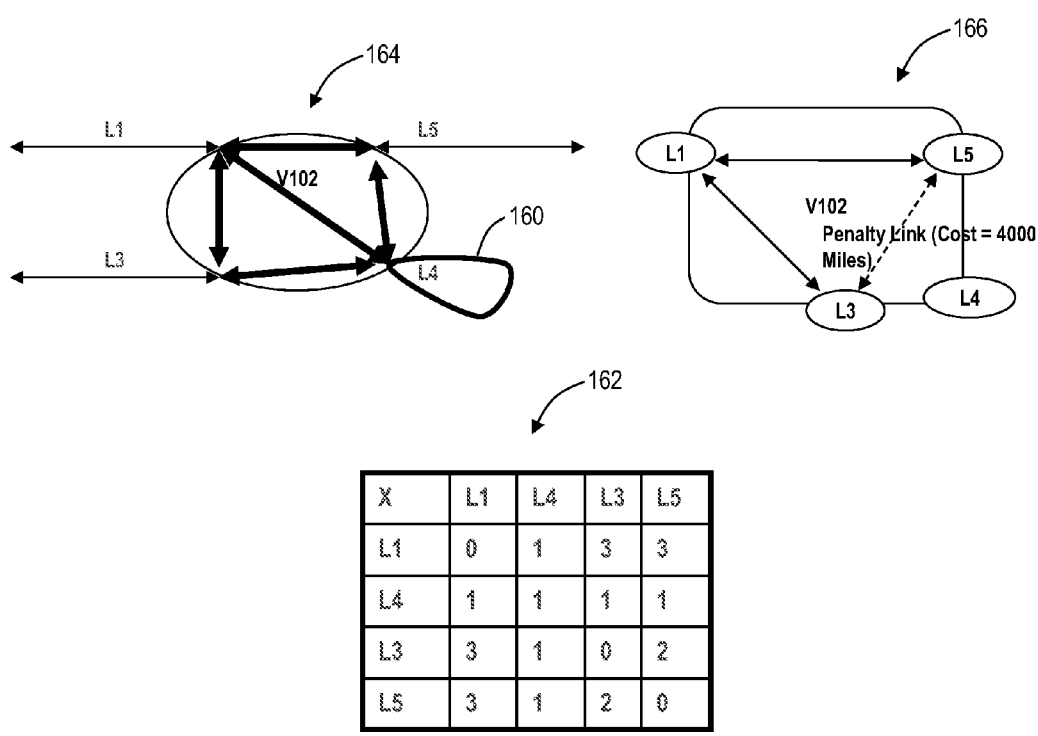
FIG. 11 is a graph of a vertex with a loopback on one of the links designating a regenerator and an exemplary control plane definition for routing with regeneration.

Referring to FIG. 11, in an exemplary embodiment, a graph illustrates the vertex V102 with a loopback 160 on one of the links designating a regenerator. FIG. 11 also illustrates an exemplary control plane definition for routing with regeneration. As described herein, M2 for V102=[L1×L4×L3×L5] with the diagonal representing regeneration. A table 162 may represent values for M2 at the vertex V102 with connectivity definitions including regenerators. These values may include, for example, connectivity only with a regenerator M[i,j]=2, connectivity with both a regenerator and directly M[i,j]=3, no regenerator connectivity—only direct connectivity M[i,j]=1, and no connectivity at all M[i,j]=0. The table 162 is thus illustrated based on the connectivity in a graph 164. In the graph 164, only the link L4 includes a regenerator denoted with the loopback 160. From a control plane perspective, regenerators may be considered a penalty. In a path computation for the control plane, there may be various cases for the regenerator including—preventing use of regenerators, allowing connections with regenerators without any penalty, or allowing connections with regenerators with a penalty cost built in. For example, a graph 166 illustrates a routing scenario for a control plane assigning a penalty cost of 4000 to connect between links L3 and L5 since these links require traversing link L4 which is a regenerator.

Figure 12:
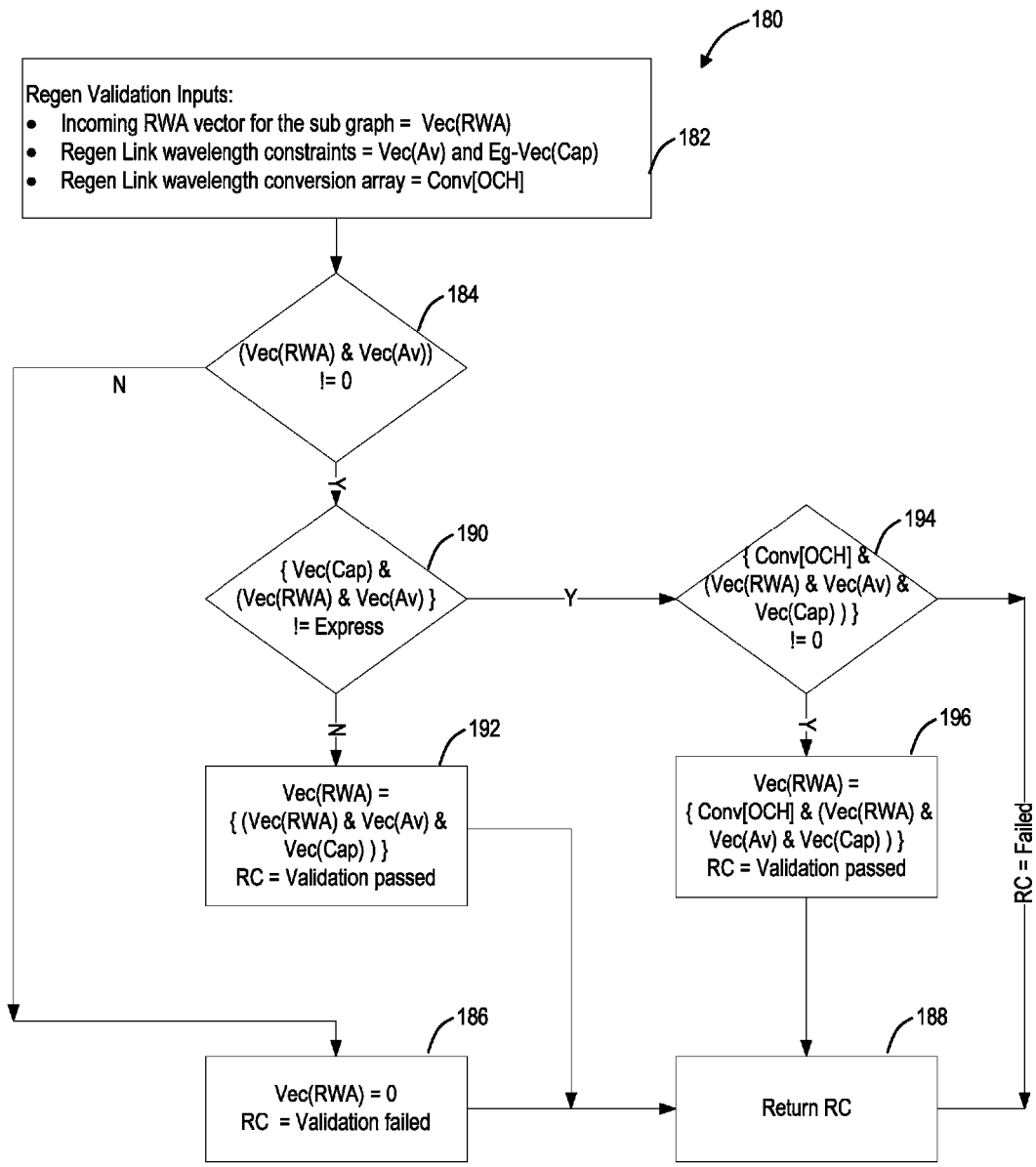
FIG. 12 is a flowchart of a regenerator wavelength continuity validation method with wavelength conversion.

Referring to FIG. 12, in an exemplary embodiment, a flowchart illustrates regenerator wavelength continuity validation method 180 with wavelength conversion. A regeneration link is associated with all link and nodal constraints. However the nodal constraints or the connectivity pairs for the same link get transformed to edges e' during a Dijkstra algorithm run as described herein. This is different from the above way of graph transformation. The regeneration links are associated with the link constraints: wavelength availability vectors, wavelength capabilities vectors and bandwidth availability, and the nodal constraints: connectivity pairs. The regeneration link can also be used to add/drop the wavelengths. Hence, whether the same link is the source or destination link, path computation can still validate the same by validating the wavelength availability and capability vectors. Additionally if the regeneration supports wavelength conversion and additional wavelength conversion matrix or array, data structures may be implementation dependent here allowing re-definition of the RWA vector assignment on the path further ahead.

The regeneration validation and RWA assignment algorithm includes: an optical or wavelength channel, OCH-x, can be optical-electrical-optical (OEO) regenerated on the OMS link if: the link is available in either direction based on availability vector and the capability vector indicates express based on capability vector. The OCH-x can be add/dropped on a regenerated OMS link if: the link is available in either direction based on availability vector and the capability vector indicates add/drop function based on capability vector. An OCH-x to OCH-y wavelength conversion can occur if OCH-x available on the link in ingress direction, OCH-x capability vector indicates express in an ingress direction, and if OCH-x is not available/expressed in an egress direction, a wavelength conversion matrix/array allows reassignment of the path wavelength RWA vector to the new egress values based on the conversion matrix.

The regenerator wavelength continuity validation method 180 with wavelength conversion includes inputs of an incoming RWA vector for the sub graph=Vec(RWA), regenerator link wavelength constraints=Vec(Av) and Eg-Vec(Cap), and a regenerator link wavelength conversion array=Conv[OCH] (step 182). The continuity validation method 180 checks if (Vec(RWA) & Vec(Av)) equal zero (step 184), and if so, the continuity validation method 180 sets the Vec(RWA) equal to zero indicating a validation failure (step 186) and returns to the routing controller (step 188). If (Vec(RWA) & Vec(Av)) does not equal zero, the continuity validation method 180 checks if {Vec(Cap) & (Vec(RWA) & Vec(Av)} are set to express (step 190). If {Vec(Cap) & (Vec(RWA) & Vec(Av)} is set to express, Vec(RWA) is set to {(Vec(RWA) & Vec(Av) & Vec(Cap))} and validation is passed (step 192), and the continuity validation method 180 returns to the routing controller (step 188). If {Vec(Cap) & (Vec(RWA) & Vec(Av)} is not set to express, {Conv[OCH] & (Vec(RWA) & Vec(Av) & Vec (Cap))} are checked if they equal zero (step 194), and if so, validation fails and the continuity validation method 180 returns to the routing controller (step 188). If not, Vec(RWA) is set to {Conv[OCH] & (Vec(RWA) & Vec(Av) & Vec (Cap))} and validation is passed (step 196) and the continuity validation method 180 returns to the routing controller (step 188).

Figure 13:
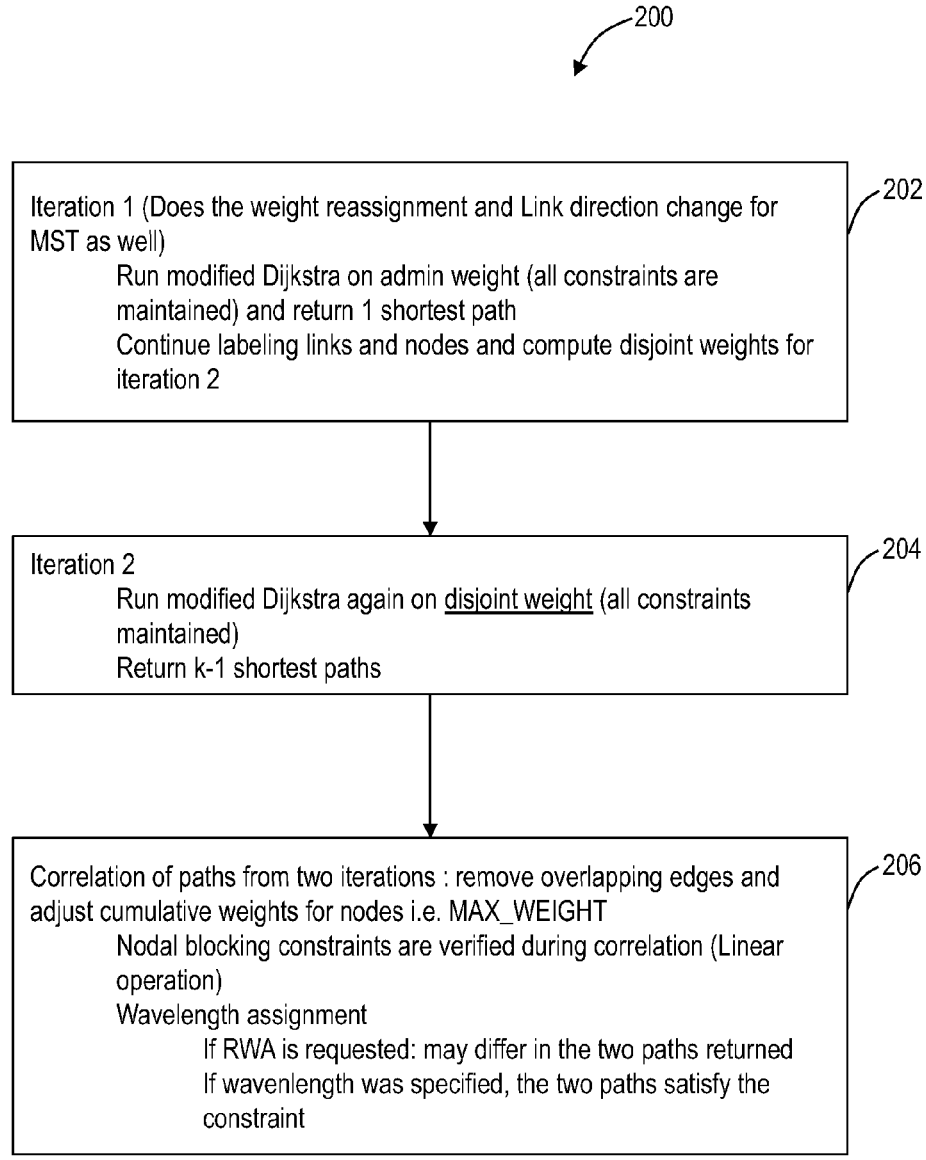
FIG. 13 is a flowchart of a K—Disjoint Path computation method based on Suurballe's Disjoint algorithm.

Referring to FIG. 13, in an exemplary embodiment, a flowchart illustrates a K-Disjoint Path computation method 200 based on Suurballe's Disjoint algorithm. With the path computation systems and methods, since the new graph after transformation treats the unidirectional links as vertices, the Suurballe's algorithm actually returns to link disjoint paths rather than node-disjoint paths on the actual network. The algorithm works in two iterations of the modified Dijkstra algorithm. The path computation systems and methods may introduce the concept of disjoint weights instead of modifying the graph itself. This also helps in validating node-disjoint versus link-disjoint paths. Thus, the path computation systems and methods may include a disjoint path computation based on Suurballe's disjoint algorithm. This always gives link disjoint if node disjoint is not found, and after correlation, node disjoint paths may be determined if one exists (last step of the algorithm). Further, this may maintain all of the constraints described herein. K Shortest disjoint paths are returned in the second iteration of the algorithm. Subsequently, wavelength continuity may be verified during correlation of the returned paths and wavelength vector may be assigned giving information on the available wavelengths on each path. Introduced disjoint weights are assigned as part of first iteration itself. If there are isolated nodes with respect to a source and destination path computation, they are ignored in the minimum spanning tree (MST) labeling as per Suurballe's algorithm. During a correlation phase, nodal and link constraints may be validated. If the correlation fails, the link or node disjoint paths do not exists.

First, the computation method 200 performs a first iteration (step 202). The first iteration also performs weight reassignment and link direction change for the MST as well. The first iteration includes running the modified Dijkstra algorithm based on admin weight while maintaining all constraints to return a shortest path. The first iteration continues labeling links and nodes and computing disjoint weights for a second iteration. The first iteration may label all links in the shortest path returned and assign disjoint weight=MAX_WEIGHT to all pairs nodal matrix (M) in the shortest path. Next, the computation method 200 performs a second iteration (step 204). The first iteration of the computation method 200 provides the shortest path in the network. Additionally, a disjoint weight is assigned to all the vertices and links. In particular, all edges and vertices scanned as part of the first run are labeled. Note, the first iteration may not be able to scan the whole graph (all links and nodes in the network) due to partial nodal connectivity, but this is not an issue since the computation method 200 is only concerned with a connected subgraph of the whole network. The idea is to run all the algorithms on the connected sub-graphs only. All the nodal connectivity pairs which are part of the returned shortest path are assigned a MAX_WEIGHT, a special value (really high value). All links (graph vertices) in reverse direction are labeled for the next modified Dijkstra algorithm run in the second iteration.

The second iteration runs the modified Dijkstra algorithm again on the disjoint weight while maintaining all constraints to return k−1 shortest paths. Subsequent to the first and second iterations, the computation method 200 performs a correlation of paths from the two iterations to remove overlapping edges and adjust cumulative weights for nodes i.e. MAX_WEIGHT (step 206). Here, nodal blocking constraints are verified during the correlation of paths (Linear operation). Wavelength assignment is also verified. If an RWA is requested, wavelengths may differ in the two paths returned, and if wavelength was specified, the two paths satisfy the constraint. If the computed paths have a cumulative weight>MAX_WEIGHT then they are link disjoint only, and if the computed paths have a cumulative weight<MAX_WEIGHT then they are node disjoint only. The second iteration of modified Dijkstra algorithm is run with the disjoint weights calculated earlier as part of first iteration. The second iteration returns k−1 shortest paths which could either be link disjoint only or link and node disjoint both from the path returned in the first iteration. Both the link and nodal constraints are validated for the shortest path from the first iteration to each of the (k−1) shortest paths returned from second iteration. It may be possible that this correlation fails for the first correlation, but we continue for the rest of correlations as 1: (k−1). Overlapping edges are removed (trap topology). Cumulative weights are re-adjusted from MAX_WEIGHT in the first iteration as follows. If the cumulative weight is greater than the MAX_WEIGHT, this is a trap topology and overlapping edges are removed and the forward sub-paths are swapped and the MAX_WEIGHT is subtracted from each of the paths. For link disjoint only, the cumulative weight stays greater than MAX_WEIGHT. If the cumulative weight is less than the MAX_WEIGHT, the result is node and link disjoint paths already. At the final step, if the computed paths' cumulative weight is greater than the MAX_WEIGHT, this implies link disjoint only and a value (h* MAX_WEIGHT) can be subtracted from the cumulative weight, where h is the number of overlapping connectivity pairs/nodes. If the computed paths cumulative weight is less than the MAX_WEIGHT, this implies node disjoint paths.

Figure 14A:
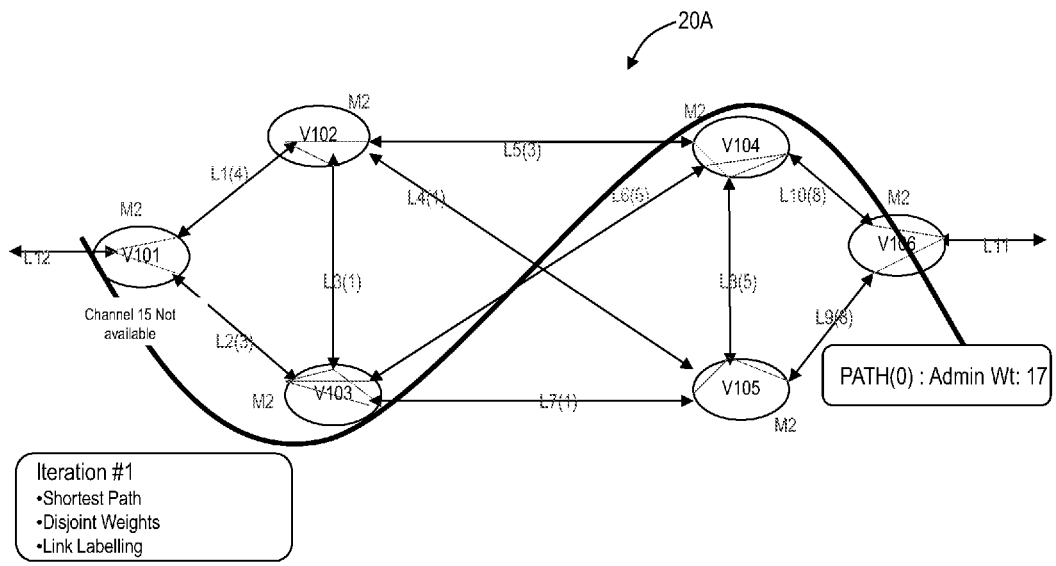
FIGS. 14A-14C are graphs of an exemplary implementation of the computation method of FIG. 13 illustrated on the graph of the network of FIG. 1.
Figure 14B:
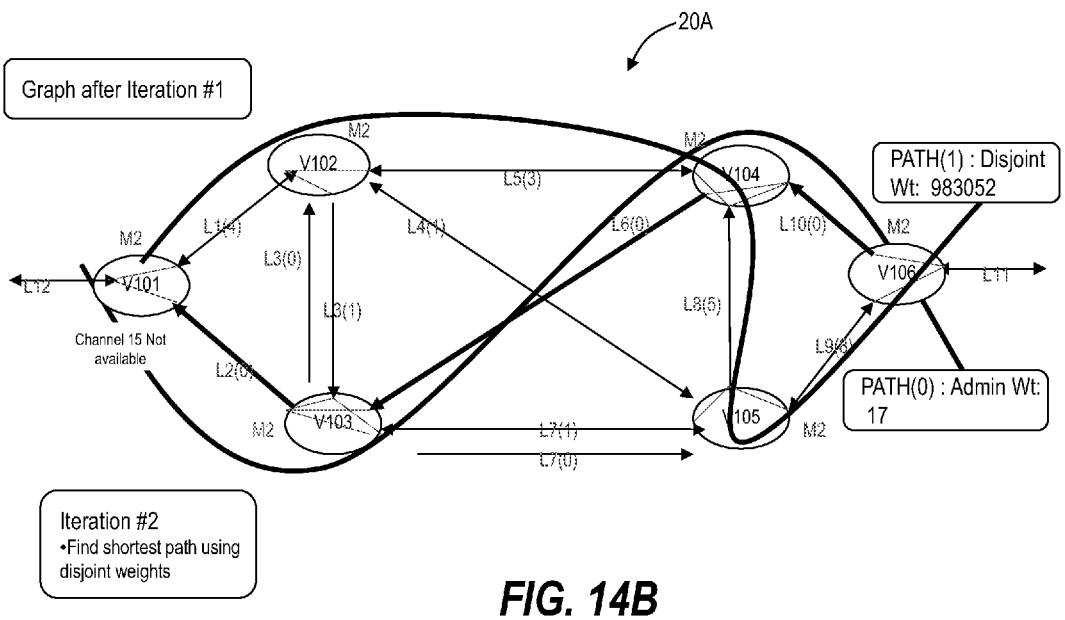
Figure 14C:
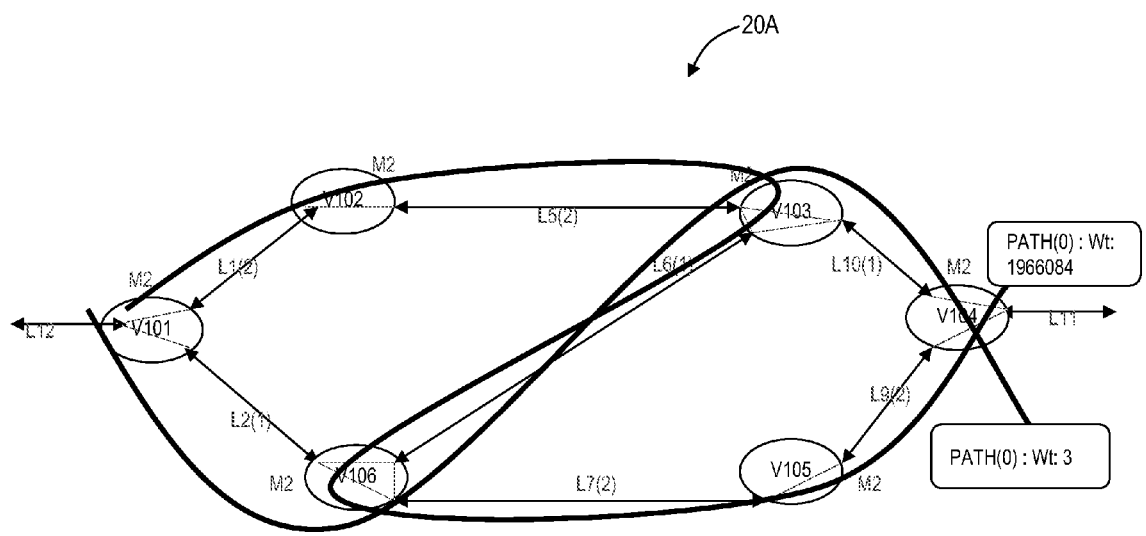

Referring to FIGS. 14A-14C, in an exemplary embodiment, an exemplary implementation of the computation method 200 is illustrated on the graph 20A of the network 10. Similar to FIG. 10B, the wavelength channel 15 is changed to unavailable at the node V101. FIG. 14A illustrates the first iteration of the computation method 200 which determines a shortest path (e.g., vertices V101-V103-V104-V106 with an administrative weight of 17), computes disjoint weights, and performs link labeling. FIG. 14B illustrates the graph after the first iteration and on the second iteration finding a shortest path using disjoint weights (e.g., vertices V101-V102-V104-V105-V105 with a disjoint weight of 983052). The administrative weight % for the second path (e.g., 21) too indicates its link disjoint but not node disjoint thus, the computation method 200 cannot correlate the two paths, since the two paths are already link disjoint. This is a disjoint run for a trap topology graph. FIG. 14C illustrates a step of correlation. Here, reversed edge L6 is removed. The nodal constraints for V106 and V103 are verified—L2< >L7 and L5< >L10. The overlapping nodes number * MAX_WEIGHT is subtracted from the cumulative weight of PATH(1) yielding node and link disjoint paths.

Figure 15:
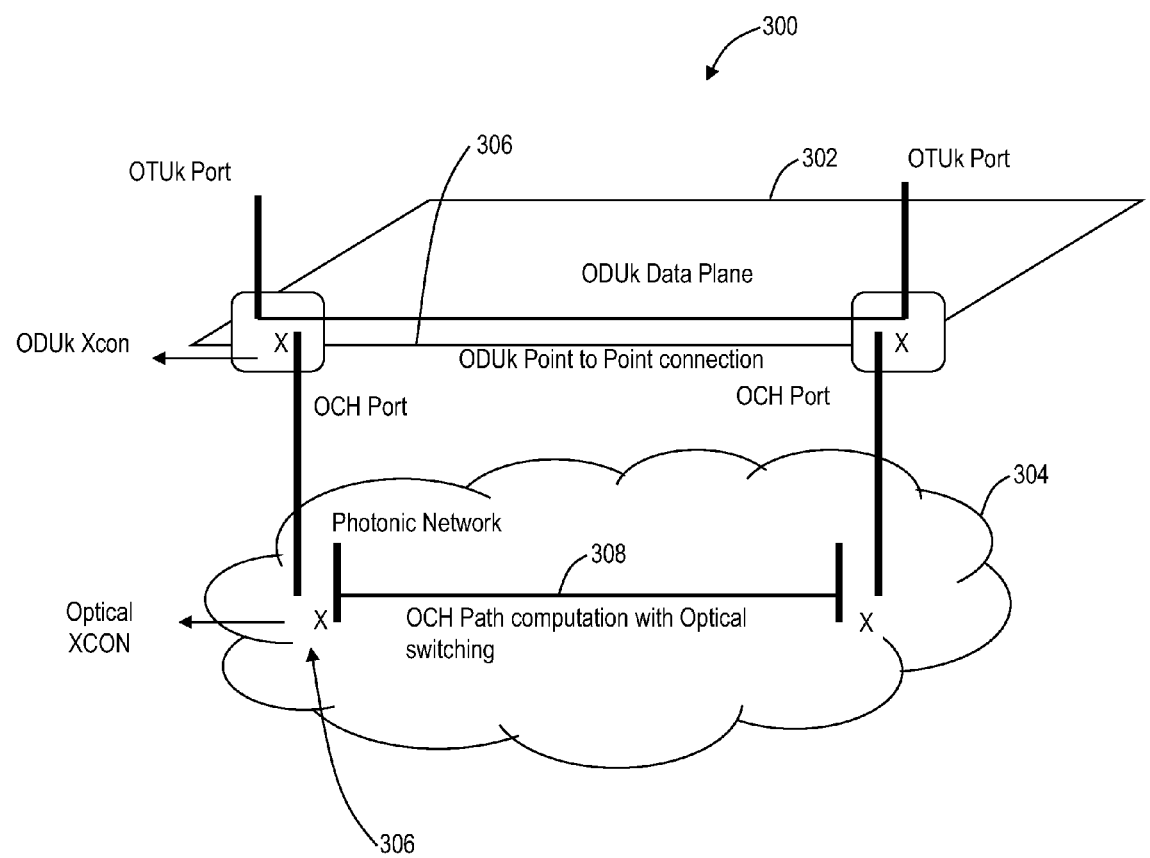
FIG. 15 is a network diagram of a multi constraint model using the path computation systems and methods.

Referring to FIG. 15, in an exemplary embodiment, a network diagram 300 illustrates a multi constraint model using the path computation systems and methods. As described herein, in an exemplary embodiment, the path computation systems and methods may be utilized in mixed digital/photonic networks. The network diagram 300 includes a digital data plane 302, e.g. OTN such as an Optical channel Data Unit-k (ODUk) data plane, and a photonic network 304, e.g. Optical Channels (OCH). Conceptually All ODUk< >OCH constraints on the tail nodes (end point) can be viewed as a three step problem. First, a point to point connectivity problem where ODUk cross connects (XCON) must be determined on the data plane 302 for an ODUk point to point connection 306. Also, optical cross connects (XCON) 306 must be determined on photonic network 304 at the tail nodes between the user-network interface (UNI) and network-network interface (NNI) ports. Second, an optical OCH path computation 308 with optical switching is required to provide a transparent ODUk channel between NNI ports. The path computation systems and methods with nodal and link constraints described herein may be utilized for the OCH path computation 308. Finally, wavelength assignment, wavelength capability, nodal constraints, etc. may be determined based on the ODUk point to point connection 306 and the OCH path computation 308. Note, while OTN is described herein, those of ordinary skill in the art will recognize the digital data plane contemplates use with a variety of Layer 1/Layer 2 protocols such as SONET, SDH, Ethernet, and the like.

Figure 16:
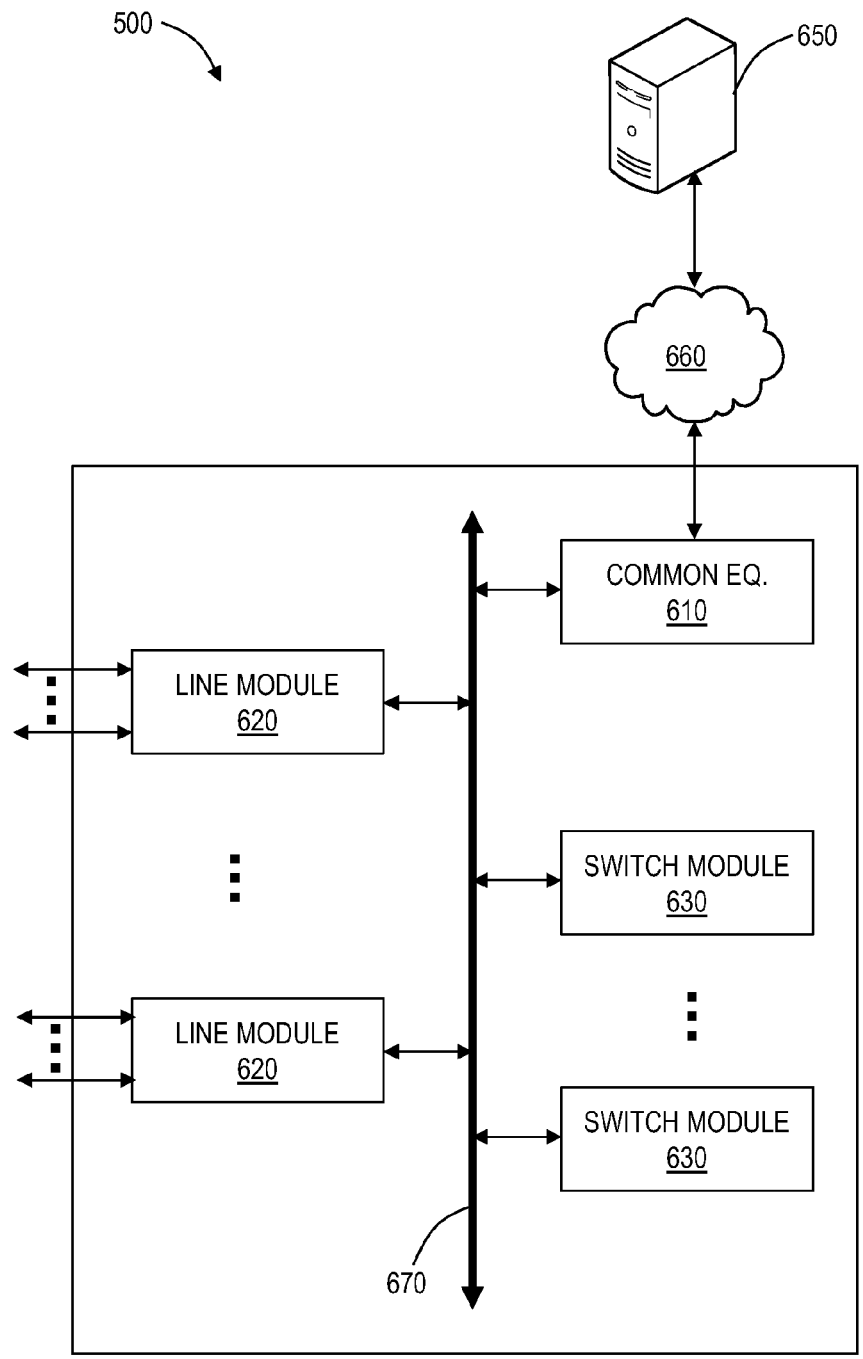
FIG. 16 is a block diagram of an exemplary optical network element for use with the path computation systems and methods.

Referring to FIG. 16, in an exemplary embodiment, a block diagram illustrates an exemplary optical network element 500 for use with the path computation systems and methods. The network element 500 may form any of the network elements 12, the vertices/nodes, and the like. In an exemplary embodiment, the network element 500 includes common equipment 610, one or more line modules 620, and one or more switch modules 630. The common equipment 610 may include power; a control module; operations, administration, maintenance, and provisioning (OAM&P) access; and the like. The common equipment 610 may connect to a management system 650 through a data communication network 660. The management system 650 may include a network management system (NMS), element management system (EMS), or the like. Additionally, the common equipment 610 may include a control module configured to operate a control plane and the systems and methods described herein.

The network element 500 may include an interface 670 for communicatively coupling the common equipment 610, the line modules 620, and the switch modules 630 therebetween. For example, the interface 670 may include a backplane, mid-plane, a bus, optical or electrical connectors, or the like. The line modules 620 are configured to provide ingress and egress to the switch modules 630, and are configured to provide interfaces for digital and optical channels as described herein. In an exemplary embodiment, the line modules 620 may form ingress and egress switches with the switch modules 630 as center stage switches for a three-stage switch, e.g. a three stage Clos switch. The line modules 620 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 620 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 620 may include DWDM interfaces, short reach interfaces, and the like, and may connect to other line modules 620 on remote NEs, end clients, the edge routers, and the like. From a logical perspective, the line modules 620 provide ingress and egress ports to the network element 500, and each line module 620 may include one or more physical ports.

The switch modules 630 are configured to switch services between the line modules 620. For example, the switch modules 630 may provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 1006 may include both Time Division Multiplexed (TDM) (i.e., circuit switching) and packet switching engines. The switch modules 630 may include redundancy as well, such as 1:1, 1:N, etc. Those of ordinary skill in the art will recognize the network element 500 may include other components which are omitted for simplicity, and that the systems and methods described herein are contemplated for use with a plurality of different network elements with the network element 500 presented as an exemplary type of network element. For example, in another exemplary embodiment, the network element 500 may not include the switch modules 630, but rather have the corresponding functionality in the line modules 620 (or some equivalent) in a distributed fashion. For the network element 500, other architectures providing ingress, egress, and switching therebetween are also contemplated for the systems and methods described herein. In an exemplary embodiment, the path computation systems and methods contemplate use with the network element 500. However, the path computation systems and methods are not limited to the network element 500 and contemplate use on any photonic node/network element.

Figure 17:
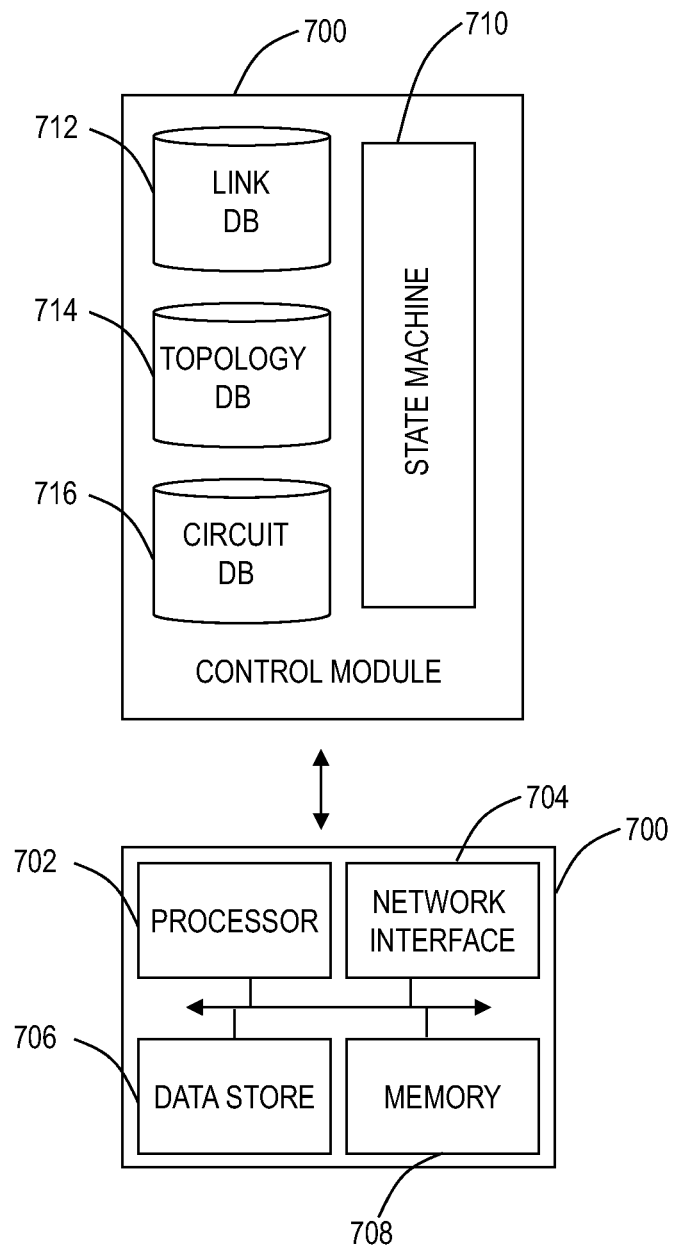
FIG. 17 is a block diagram of a control module to provide control plane processing, path computations, and/or OAM&P for a node.

Referring to FIG. 17, in an exemplary embodiment, a block diagram illustrates a control module 700 to provide control plane processing, path computations, and/or OAM&P for a node such as the network element 500. The control module 700 may be part of common equipment, such as common equipment 610 in the network element 500. The control module 700 may include a processor 702 which is hardware device for executing software instructions such as operating the control plane. The processor 702 may be any custom made or commercially available processor, a central processing unit (CPU), an auxiliary processor among several processors associated with the control module 700, a semiconductor-based microprocessor (in the form of a microchip or chip set), or generally any device for executing software instructions. When the control module 700 is in operation, the processor 702 is configured to execute software stored within memory, to communicate data to and from the memory, and to generally control operations of the control module 700 pursuant to the software instructions. In an exemplary embodiment, the path computation systems and methods contemplate use with the control module 700.

The control module 700 may also include a network interface 704, a data store 706, memory 708, and the like, all of which are communicatively coupled therebetween and with the processor 702. The network interface 704 may be used to enable the control module 700 to communicate on a network, such as to communicate control plane information to other control modules, to the management system 660, and the like. The network interface 704 may include, for example, an Ethernet card (e.g., 10BaseT, Fast Ethernet, Gigabit Ethernet) or a wireless local area network (WLAN) card (e.g., 802.11a/b/g). The network interface 704 may include address, control, and/or data connections to enable appropriate communications on the network. The data store 706 may be used to store data, such as control plane information, provisioning data, OAM&P data, etc. The data store 706 may include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 706 may incorporate electronic, magnetic, optical, and/or other types of storage media. The memory 708 may include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 708 may incorporate electronic, magnetic, optical, and/or other types of storage media. Note that the memory 708 may have a distributed architecture, where various components are situated remotely from one another, but may be accessed by the processor 702.

From a logical perspective, the control module 700 may include a state machine 710, a link database (DB) 712, a topology DB 714, and a circuit DB 716. The control module 700 may be responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize ASON, GMPLS, OSRP, and the like. Those of ordinary skill in the art will recognize the path computation systems and methods may utilize any type control plane for controlling the network elements and establishing connections therebetween.

The state machine 710 may be configured to implement the behaviors described herein. The DBs 712, 714, 716 may be stored in the memory 708 and/or the data store 706. The link DB 712 includes updated information related to each link in a network including administrative weights, disjoint weights, for example. The topology DB 714 includes updated information related to the network topology, and the circuit DB 716 includes a listing of terminating circuits and transiting circuits at the network element 500 where the control module 700 is located. The control module 700 may utilize control plane mechanisms to maintain the DBs 712, 714, 716. For example, HELLO messages may be used to discover and verify neighboring ports, nodes, protection bundles, boundary links, and the like. Also, the DBs 712, 714, 716 may share topology state messages to exchange information to maintain identical data. Collectively, the state machine 710 and the DBs 712, 714, 716 may be utilized to advertise topology information, capacity availability, provide connection management (provisioning and restoration), and the like. Each link in a network may have various attributes associated with it such as, for example, line protection, available capacity, total capacity, administrative weight, protection bundle identification, delay, designation of boundary link, and the like. The state machine 710 and the DBs 712, 714, 716 may be configured to provide automated end-to-end provisioning. For example, a route for a connection may be computed from originating node to terminating node using the path computation systems and methods described herein.

Further, the control module 700 is configured to communicate to other control modules 700 in other nodes on the network. This communication may be either in-band or out-of-band. For SONET networks and similarly for SDH networks, the control module 700 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, in-band signaling mechanism may be used with OTN overhead. The General Communication Channels (GCC) defined by ITU-T G.709 are in-band side channels used to carry transmission management and signaling information within Optical Transport Network elements. The GCC channels include GCC0 and GCC1/2. GCC0 are two bytes within OTUk overhead that are terminated at every 3R (Re-shaping, Re-timing, Re-amplification) point. GCC1/2 are four bytes (i.e. each of GCC1 and GCC2 include two bytes) within ODUk overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

In addition to the foregoing, it will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Variously, the path computation systems and methods extend the Dijkstra algorithm for photonic networks considering photonic layer constraints during shortest path computations, i.e. wavelength availability, wavelength capability at both ends of a link at each node, nodal connectivity constraints, etc. The path computation systems and methods compute a single pass through the network graph, and apply nodal network constraints at each step through the graph. Unlike traditional Dijkstra algorithm, the computation results contain multiple paths from source to destination, sorted by their cost. The number of outcomes may be limited if even higher speeds are desired. The vector of resulting paths also defines wavelengths available for each valid path. The traditional Dijkstra algorithm proceeds through spanning of nodes and labeling or scanning of nodes. The described path computation systems and methods proceed through spanning of nodes but labeling of links. A single label is used for egress direction, while ingress direction is ignored during labeling step. This change in algorithm enable following multiple paths from a single node, unlike single path during traditional Dijkstra algorithm.

During computation, the path computation systems and methods use existing network trees as collected by control plane advertisements without any modification. This feature, in addition to single pass through the network graph, makes the path computation systems and methods well fitted for on-demand real-time computation as part of control a photonic network element or a path computation element (PCE). In addition to nodal connectivity constraint, the path computation systems and methods consider fixed connectivity between link endpoints at a node. A case of fixed connection in photonic network is a regeneration function. The fixed connectivity constraints are provided by client layer network as part of multi-layer network topology advertisements. The path computation systems and methods are then applied to computation of disjoint paths. The procedure applied follows Suurballe shortest pair computation, with a few key changes. Due to diversity and constraints of photonic nodes, it is beneficial to compute disjoint link path in addition to disjoint node (traditional Suurballe's algorithm). The three steps in the Suurballe computation use a modified path computation algorithm to compute both disjoint paths. A final result of correlation provides a main path with multiple disjoint paths, ordered by cost.

Additionally, the path computation systems and methods can provide k-shortest paths first for a specified wavelength (OCH) or if no wavelength is specified, a RWA vector for each K shortest paths first with available wavelengths on respective paths. This can be used to avoid re-running the algorithm for each wavelength if a particular wavelength fails to meet an optical signal-to-noise ratio (OSNR).

The path computation systems and methods also provide for path computation with loops. In case a path needs to be calculated where a node provides a regenerator functionality, this allows for cases with the regenerator either co-existing with the node or subtended on another node which itself is part of the photonic path computation. Path computation allows for such loops where the hop count for such loops can be restricted to a certain minimal value like 2 in most cases. The resultant path indicates where the loops are encountered or say the location of regenerator in the path. The algorithm can be modified to cater to wavelength conversion, and in such cases the resultant RWA (routing wavelength assigned) includes multiple wavelength vectors for the corresponding path segments. The abovementioned lambda bit vector is also provided for disjoint path computations.

Advantageously, the path computation systems and methods are computationally efficient and able to work within a network element and in context of real-time control plane systems and methods. That is, the path computation systems and methods can be implemented in a network element, PCE, etc. and work with a Layer-0 (WDM) control plane to enable a self-healing control plane capable of full Layer-0 path computation without involvement of network management system. Thus, the path computation systems and methods enable similar functionality at Layer-0 as is currently available at Layer-1 (e.g., SONET, SDH, OTN, etc.) with control planes. The path computation systems and methods include a flexible system configuration, described by simple capability/availability/connectivity model for simple expansion of existing control plane model and advertisements. This is in contrast to complex constraints as described in other approaches, such as WSON. The path computation systems and methods include computation with regenerator/wavelength conversion functionality included in the network.

Advantageously, no explicit graph conversion is required during computation. This means no additional memory space is required to hold a converted graph. This is especially beneficial in embedded systems with limited computational resources (such as in distributed control planes). The graph reduction is built into the path computation systems and methods with no separate step required providing improved computation times. Further, the path computation systems and methods can provide multi-result outcomes along with all available wavelengths on each individual path, from single pass through algorithms speeding up diverse routing computation.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A processor implemented path computation method, comprising:
   defining photonic constraints associated with a network, wherein the photonic constraints comprise wavelength capability constraints at each node in the network, wavelength availability constraints at each node in the network, and nodal connectivity constraints of each node in the network;
   performing a constrained path computation in the network using Dijkstra's algorithm on a graph model of the network with the photonic constraints considered therein;
   modifying the graph model to reflect the photonic constraints representing nodes in the network as vertices in the graph model;
   utilizing directed edges in the graph model to apply the wavelength capability constraints and the wavelength availability constraints; and
   utilizing connectivity pairs as a subset of edges incident on each of the vertices to apply the nodal connectivity constraints.

2. The processor implemented path computation method of claim 1, further comprising:
   performing the constrained path computation in the network using Dijkstra's algorithm through spanning of the nodes and labeling of links and applying the photonic constraints.

3. The processor implemented path computation method of claim 1, further comprising:
   modifying the graph model to reflect the photonic constraints by translating the network from an undirected graph to a directed graph through transforming egress unidirectional links from every node to vertices and interconnections within each node to edges.

4. The processor implemented path computation method of claim 3, further comprising:

modifying the graph model to reflect the photonic constraints through labeling thereby avoiding a process of transforming the graph model.

5. The processor implemented path computation method of claim 3, further comprising:
   performing the constrained path computation in the network using Dijkstra's algorithm on the modified graph model of the network.

6. The processor implemented path computation method of claim 3, further comprising:
   for a regenerator at one of the nodes, providing a directed edge associated with the regenerator with a higher cost to bias path computation over the regenerator.

7. The processor implemented path computation method of claim 1, further comprising:
   maintaining bit vectors for each of the wavelength capability constraints and wavelength availability constraints at each node in the network;
   maintaining a connectivity list for the nodal connectivity constraints of each node in the network; and
   communicating the bit vectors and the connectivity list utilizing a control plane.

8. The processor implemented path computation method of claim 1, further comprising:
   computing disjoint paths with a modification of Suurballe's algorithm.

9. The processor implemented path computation method of claim 8, further comprising:
   performing two iterations of Dijkstra's algorithm on a modified graph model to compute the disjoint paths, wherein a first iteration returns a shortest path while labeling links and nodes and computing disjoint weights for a second iteration, and wherein the second iteration returns shortest paths based on the disjoint weights; and
   correlating the shortest paths from the two iterations while maintaining the photonic constraints associated therewith.

10. An optical network, comprising:
    a plurality of interconnected nodes each comprising wavelength capability constraints, wavelength availability constraints, and nodal connectivity constraints; and
    a path computation element associated with the plurality of interconnected photonic nodes, wherein the path computation element is configured to perform a constrained path computation through the plurality of interconnected nodes using Dijkstra's algorithm on a graph model with the photonic constraints considered therein;
    wherein the graph model represents the plurality of interconnected nodes and associated links therebetween, and wherein the graph model is modified to:
    represent each of the plurality of interconnected nodes as vertices;
    utilize directed edges to apply the wavelength capability constraints and the wavelength availability constraints; and
    utilize connectivity pairs as a subset of edges incident on each of the vertices to apply the nodal connectivity constraints.

11. The optical network of claim 10, wherein the path computation element is configured to:
    perform the constrained path computation using Dijkstra's algorithm through spanning of the nodes and labeling of links and applying the photonic constraints.

12. The optical network of claim 10, wherein the graph model is modified to reflect the wavelength capability constraints, wavelength availability constraints, and nodal connectivity constraints by translating from an undirected graph to a directed graph through transforming egress unidirectional links from every node to vertices and interconnections within each node to edges.

13. The optical network of claim 12, wherein the graph model is modified to reflect the wavelength capability constraints, wavelength availability constraints, and nodal connectivity constraints through labeling thereby avoiding a process of transforming the graph model.

14. The optical network of claim 10, further comprising:
a control plane associated with the plurality of interconnected nodes and communicatively coupled to the path computation element;
wherein each of the plurality of interconnected nodes is configured to:
maintain bit vectors for each of the wavelength capability constraints and wavelength availability constraints;
maintain a connectivity list for the nodal connectivity constraints; and
communicate the bit vectors and the connectivity list utilizing the control plane.

15. The optical network of claim 10, wherein the path computation element is configured to compute disjoint paths with a modification of Suurballe's algorithm.

16. A path computation element, comprising:
a processing device configured to:
receive photonic constraints associated with a network, wherein the photonic constraints comprise wavelength capability constraints at each node in the network, wavelength availability constraints at each node in the network, and nodal connectivity constraints of each node in the network;
create a graph model of the network with the photonic constraints considered therein; and
perform a constrained path computation in the network using Dijkstra's algorithm on the graph model of the network;
wherein the graph model comprises:
representation of nodes in the network as vertices;
representation of directed edges to apply the wavelength capability constraints and the wavelength availability constraints; and
representation of connectivity pairs as a subset of edges incident on each of the vertices to apply the nodal connectivity constraints.

* * * * *